US010389157B2

(12) United States Patent
Chen

(10) Patent No.: US 10,389,157 B2
(45) Date of Patent: Aug. 20, 2019

(54) CHARGING METHOD, APPARATUS AND SYSTEM, CHARGER, AND CHARGEABLE DEVICE

(71) Applicant: Spreadtrum Communications (Shanghai) Co., Ltd., Zhangjiang, Shanghai (CN)

(72) Inventor: Liangjin Chen, Shanghai (CN)

(73) Assignee: SRPEADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 825 days.

(21) Appl. No.: 14/868,996

(22) Filed: Sep. 29, 2015

(65) Prior Publication Data

US 2016/0190849 A1 Jun. 30, 2016

(30) Foreign Application Priority Data

Dec. 31, 2014 (CN) .......................... 2014 1 0854211

(51) Int. Cl.
*H02J 7/00* (2006.01)

(52) U.S. Cl.
CPC .......... *H02J 7/0093* (2013.01); *H02J 7/0057* (2013.01); *H02J 7/0075* (2013.01); *H02J 7/0083* (2013.01); *H02J 2007/0059* (2013.01)

(58) Field of Classification Search
CPC ....... H02J 7/0057; H02J 7/0075; H02J 7/0083
USPC ........................................ 320/139, 145, 163
See application file for complete search history.

(56) References Cited

U.S. PATENT DOCUMENTS

2010/0270979 A1 10/2010 Bonkhoff et al.
2011/0002147 A1 * 1/2011 Fukui ................ H02M 3/33507 363/21.12

FOREIGN PATENT DOCUMENTS

CN 101872994 A 10/2010
CN 103236568 A 8/2013
JP 2009170738 A 7/2009

OTHER PUBLICATIONS

Zhao, Xiaolin, "Charing Method and Charging System" Published on Aug. 7, 2013. CN103236568A. English machine translation on Oct. 15, 2018.*
Chinese 1st Office Action corresponding to Application No. 201410854211.1; dated May 5, 2015, with English summary.

* cited by examiner

*Primary Examiner* — Edward Tso
*Assistant Examiner* — Aaron Piggush
(74) *Attorney, Agent, or Firm* — Cantor Colburn LLP

(57) ABSTRACT

A charging method, a charging apparatus, a charger, a chargeable device, and a charging system are provided. The charging method includes: acquiring a control current wave from a chargeable device, wherein the control current wave is a positive current pulse, a negative current pulse, or a current having a current value equal to a reference current value; if the control current wave is the positive current pulse, adjusting an output voltage of a charger to be greater than a present output voltage; if the control current wave is the negative current pulse, adjusting the output voltage of the charger to be less than the present output voltage; and if the control current is the current having the current value equal to the reference current value, maintaining the output voltage unchanged. Accordingly, an output capability of the charger is fully used, thus achieving fast charging.

9 Claims, 11 Drawing Sheets

CHARGING METHOD, APPARATUS AND SYSTEM, CHARGER, AND CHARGEABLE DEVICE

CROSS-REFERENCE TO RELATED APPLICATIONS

The present invention claims priority under 35 U.S.C. § 119 to Chinese Application No. 201410854211.1, filed on Dec. 31, 2014, the entire content of which is incorporated herein by reference.

TECHNICAL FIELD

The present disclosure generally relates to charging techniques, and more particularly, to a charging method, a charging apparatus, a charger, a chargeable device, and a charging system.

BACKGROUND

Existing standard chargers generally have fixed output voltages, such as 5V. However, output currents of these chargers may vary with nominal parameters thereof. The output current of the standard changer may range from 300 mA to 1800 mA.

An exiting standard USB (Universal Serial Bus) charger generally includes four pins: a VBUS pin, a DP pin, a DM pin, and a GND pin. The VBUS pin is an output pin of the USB charger, while the DP pin and the DM pin are two signal pins of the USB charger. When charging a chargeable device, such as a mobile phone or other mobile terminals, via a charger, the chargeable device is adapted to determine whether the present charger is the standard charger by detecting whether the DP pin and the DM pin are shorted. When the present charger is determined as the standard charger, the chargeable device is charged with a preset fixed output voltage.

However, in some circumstances, the charging capability of the charger is not fully used. That is because, the chargeable device is always charged with a preset fixed output voltage, regardless of the output capability of the charger.

SUMMARY

An object of the present disclosure is to make full use of the output capability of a charger, thus achieving fast charging.

In order to fulfill the above recited object, a charging method is provided according to one embodiment of the present disclosure. The charging method includes: acquiring a control current wave from a chargeable device, wherein the control current wave is a positive current pulse, a negative current pulse, or a current having a current value equal to a reference current value; if the control current wave is the positive current pulse, adjusting an output voltage of a charger to be greater than a present output voltage of the charger; if the control current wave is the negative current pulse, adjusting the output voltage of the charger to be less than the present output voltage of the charger; and if the control current is the current having the current value equal to the reference current value, maintaining the output voltage of the charger unchanged; wherein the positive current pulse refers to a pulse which has a current value greater than the reference current value and lasts at least for a first preset time length; and wherein the negative current pulse refers to a pulse which has a current value less than the reference current value and lasts at least for a second preset time length; and wherein the reference current value is greater than zero.

In some embodiments, the charging method further includes: receiving a detecting current sent from the chargeable device; and sending a feedback signal to the chargeable device when a time period of receiving the detecting current reaches a preset value, where the control current wave is acquired after the feedback signal is sent to the chargeable device.

In some embodiments, the charging method further includes: after the output voltage of the charger is adjusted, resetting the output voltage of the charger to a default output voltage when a current value of the control current wave becomes zero.

In some embodiments, adjusting the output voltage of the charger to be greater than the present output voltage of the charger includes: selecting, in a preset voltage adjustment table, a minimum voltage value greater than the value of the present output voltage, wherein the selected minimum voltage value serves as the value of the adjusted output voltage of the charger. In some embodiments, adjusting the output voltage of the charger to be less than the present output voltage of the charger includes: selecting, in the preset voltage adjustment table, a maximum voltage value less than the value of the present output voltage, wherein the selected maximum voltage value serves as the value of the adjusted output voltage of the charger.

In some embodiments, adjusting the output voltage of the charger to be greater than the present output voltage of the charger includes: implementing a subtraction to the current value of the positive current wave and the reference current value, so as to obtain a first current value deviation; obtaining a first adjusted output voltage value based on the first current value deviation and a first mapping table, wherein the first mapping table represents mapping between current value deviations and adjusted output voltage values, wherein in the first mapping table, the current value deviations correspond to the present output voltage, the adjusted output voltage values are greater than the present output voltage; and adjusting the output voltage value of the charger to be the first adjusted output voltage value. In some embodiments, adjusting the output voltage of the charger to be less than the present output voltage of the charger includes: implementing a subtraction to the current value of the negative current wave and the reference current value, so as to obtain a second current value deviation; obtaining a second adjusted output voltage value based on the second current value deviation and a second mapping table, wherein the second mapping table represents mapping between current value deviations and adjusted output voltage values, wherein in the second mapping table, the current value deviations correspond to the present output voltage, the adjusted output voltage values are less than the present output voltage; and adjusting the output voltage value of the charger to be the second adjusted output voltage value.

According to one embodiment of the present disclosure, a charging apparatus is provided. The charging apparatus includes: an acquiring unit configured to acquire a control current wave from a chargeable device, wherein the control current wave is a positive current pulse, a negative current pulse, or a current having a current value equal to a reference current value; and an adjusting unit configured to: if the control current wave is the positive current pulse, adjust an output voltage of the charger to be greater than a present output voltage of the charger, if the control current wave is the negative current pulse, adjust the output voltage of the charger to be less than the present output voltage of the charger, and if the control current is the current having the current value equal to the reference current value maintain the output voltage of the charger unchanged; wherein the positive current pulse refers to a pulse which has a current value greater than the reference current value and lasts at least for a first preset time length; wherein the negative current pulse refers to a pulse which has a current value less than the reference current value and lasts at least for a second preset time length; and wherein the reference current value is greater than zero.

In some embodiments, the charging apparatus further includes a detecting unit, wherein the detecting unit is configured to: receive a detecting current from the chargeable device; and send a feedback signal to the chargeable device when a time period of receiving the detecting current reaches a preset value.

In some embodiments, the charging apparatus further includes a resetting unit, wherein the resetting unit is configured to: reset the output voltage of the charger to a default output voltage when a current value of the control current wave becomes zero.

According to one embodiment of the present disclosure, a charger is provided. The charger includes: a detecting circuit, a feedback circuit, and a voltage converter; wherein the detecting circuit includes a comparing unit and a resistor; wherein the resistor has a first end coupled with a current input terminal of the charger, and a second end coupled with ground; wherein the comparing unit includes at least three comparators which have different threshold values, first input terminals of the at least three comparators are input with a voltage drop of the resistor, second input terminals of the at least three comparators are respectively input with the corresponding threshold values thereof, and output terminals of the at least three comparators are coupled with the feedback circuit; wherein the feedback circuit is disposed between the detecting circuit and the voltage converter, and is configured to: convert comparison results of the at least three comparators into control signals, and send the control signal to the voltage converter; and wherein the voltage converter is coupled with the feedback circuit, and is configured to adjust an output voltage of the charger based on the control signals.

In some embodiments, detecting circuit further includes a logic controller and a switching unit; wherein the logic controller is coupled with the output terminals of the comparators, and is configured to: receive the comparison results of the comparators, start recording time if a first number of comparators have a threshold value less than a value of the voltage drop of the resistor, wherein the first number of comparators is obtained based on the comparison results, and switch on the switching unit when the recorded time reaches a preset value; and wherein the switching unit is coupled with the logic controller, and is configured to reduce a resistance of the resister when being switched on.

In some embodiments, the switching unit includes any one of: a NMOS transistor, a PMOS transistor, a triode, and an electric relay.

In some embodiments, the switching unit includes a NMOS transistor, the resistor includes a first resistor and a second resistor; wherein the first resistor has a first end coupled with the first input terminals of the at least three comparators, and a second end coupled with a drain of the NMOS transistor; wherein the second resistor has a first end coupled with the drain of the NMOS transistor, and a second end coupled with a ground; and wherein the NMOS transistor has a gate coupled with the logic controller, and a source coupled with the ground.

In some embodiments, the switching unit includes a NMOS transistor, the resistor includes a first resistor and a second resistor; wherein the first resistor has a first end coupled with a source of the NMOS transistor, and a second end coupled with a ground; wherein the second resistor has a first end coupled with a drain of the NMOS transistor and the first input terminals of the at least three comparators, and a second end coupled with the source of the NMOS transistor; and wherein the NMOS transistor has a gate coupled with the logic controller.

In some embodiments, the switching unit includes a NMOS transistor, the resistor includes a first resistor and a second resistor; wherein the first resistor has a first end coupled with the first input terminals of the at least three comparators, and a second end coupled with a drain of the NMOS transistor; wherein the second resistor has a first end coupled with the first end of the first resistor, and a second end coupled with a source of the NMOS transistor; wherein a gate of the NMOS transistor is coupled with the logic controller, and the source of the NMOS transistor is coupled with a ground.

In some embodiments, the switching unit includes a NMOS transistor, the resistor includes a first resistor and a second resistor; wherein the first resistor has a first end coupled with a source of the NMOS transistor, and a second end coupled with a ground; wherein the second resistor has a first end coupled with a drain of the NMOS transistor, and a second end coupled with the ground; and wherein a gate of the NMOS transistor is coupled with the logic controller, the drain of the NMOS transistor is coupled with the first input terminals of the at least three comparators.

In some embodiments, the voltage converter includes an AC-DC converter, or a DC-DC converter.

In some embodiments, the voltage converter includes an AC-DC converter, and the feedback circuit includes an isolator which is configured to physically isolate the AC-DC converter and the detecting circuit.

In some embodiments, the isolator includes a light coupling device.

According to one embodiment of the present disclosure, a chargeable device is provided. The chargeable device includes a variable current source and a controller; wherein the controller is configured to control the variable current source to output a control current wave; wherein the variable current source is configured to send the control current wave to a charger; wherein the control current wave is a positive current pulse, a negative current pulse, or a current having a current value equal to a reference current value; wherein the positive current pulse refers to a pulse which has a current value greater than the reference current value and lasts at least for a first preset time length; wherein the negative current pulse refers to a pulse which has a current value less than the reference current value and lasts at least for a second preset time length; and wherein the reference current value is greater than zero.

In some embodiments, the chargeable device further includes a comparator, wherein the comparator has a first input terminal input with a voltage drop of a detecting circuit in the charger, and a second input terminal input with a threshold value of the comparator; and wherein the comparator is configured to compare a value of the voltage drop of the detecting circuit and the threshold value of the comparator, and send a comparison result to the controller.

In some embodiments, the chargeable device further includes an ADC circuit, wherein the ADC circuit is coupled with the controller; and wherein the ADC circuit is configured to obtain the voltage drop of the detecting circuit, and send the voltage drop of the detecting circuit to the controller.

According to one embodiment of the present disclosure, a charging system is provided. The charging system includes a charger and a chargeable device; wherein the charger is configured to send a control current wave to the charger, the control current wave is a positive current pulse, a negative current pulse, or a current having a current value equal to a reference current value, wherein the positive current pulse refers to a pulse which has a current value greater than the reference current value and lasts at least for a first preset time length, the negative current pulse refers to a pulse which has a current value less than the reference current value and lasts at least for a second preset time length, the reference current value is greater than zero; and wherein the chargeable device is configured to: if the control current wave is the positive current pulse, adjust an output voltage of the charger to be greater than a present output voltage of the charger; if the control current wave is the negative current pulse, adjust the output voltage of the charger to be less than the present output voltage of the charger; and if the control current is the current having the current value equal to the reference current, maintain the output voltage of the charger unchanged.

In comparison with prior art, technique solutions provided by the present disclosure have following advantages.

When charging a chargeable device via a charger, an output voltage of the charge can be adjusted by sending a control current wave from the chargeable device to the charger. Specifically, when the control current wave sent from the chargeable device is a positive current pulse, the output voltage of the charger is adjusted to be greater than a present output voltage of the charger; and when the control current wave sent from the chargeable device is a negative current pulse, the output voltage of the charger is adjusted to be less than the present output voltage of the charger. In this way, the output voltage of the charger can be adjusted. Furthermore, an output power of the charger is increased with the increase of the value of the output voltage of the charger. Accordingly, a power input into the chargeable device is also increased, that is, a current input into the chargeable device is increased. By such way, an output capability of the charger can be fully used, thus achieving fast charging.

Moreover, before acquiring the control current wave from the chargeable device, a detecting current is sent from the chargeable device to the charger, so as to effectively reduce noise interference. Specifically, the charger is configured to detect a time period of receiving the detecting current. Only when the time period of receiving the detecting current reaches a preset value, a feedback signal is sent to the chargeable device, thus sending the control current wave.

In addition, when a current value of the control current wave sent from the chargeable device becomes zero, which means the chargeable device does not send any current to the charger. It should be concluded that the chargeable device and the charger are disconnected with each other. In this case, the output voltage of the charger is reset to a default voltage for safely charging next time. For example, when the charger is used for charging another chargeable device, the chargeable device can be prevented from being damaged due to a high output voltage of the charger.

DETAILED DESCRIPTION

In order to clarify the objects, characteristics and advantages of the present disclosure, embodiments of the present disclosure will be described in detail in conjunction with the accompanying drawings. The disclosure will be described with reference to certain embodiments. Accordingly, the present disclosure is not limited to the embodiments disclosed. It will be understood by those skilled in the art that various changes may be made without departing from the spirit or scope of the disclosure.

An exiting standard USB (Universal Serial Bus) charger generally includes four pins: a VBUS pin, a DP pin, a DM pin, and a GND pin. The VBUS pin is an output pin of the USB charger, the DP pin and the DM pin are two signal pins of the USB charger. When charging a chargeable device, such as a mobile phone or other mobile terminals, via a charger, the chargeable device is adapted to determine whether the present charger is the standard charger by detecting whether the DP pin and the DM pin are shorted. When the present charger is determined as the standard charger, the chargeable device is charged with a preset fixed output voltage. However, in some circumstances, a charging capability of the charger is not fully used. That is because, the chargeable device is always charged with a preset fixed output voltage, regardless of an output capability of the charger.

In the present disclosure, when charging a chargeable device via a charger, an output voltage of the charge can be adjusted by sending a control current wave from the chargeable device to the charger. Specifically, if the control current wave sent from the chargeable device is a positive current pulse, the output voltage of the charger is adjusted to be greater than a present output voltage of the charger; and if the control current wave sent from the chargeable device is a negative current pulse, the output voltage of the charger is adjusted to be less than the present output voltage of the charger. In this way, the output voltage of the charger can be adjusted. Furthermore, an output power of the charger is increased with the increase of the value of the output voltage of the charger. Accordingly, a power input into the chargeable device is also increased, which means a current input into the chargeable device is increased. By such way, an output capability of the charger can be fully used, thus achieving fast charging.

Figure 1:
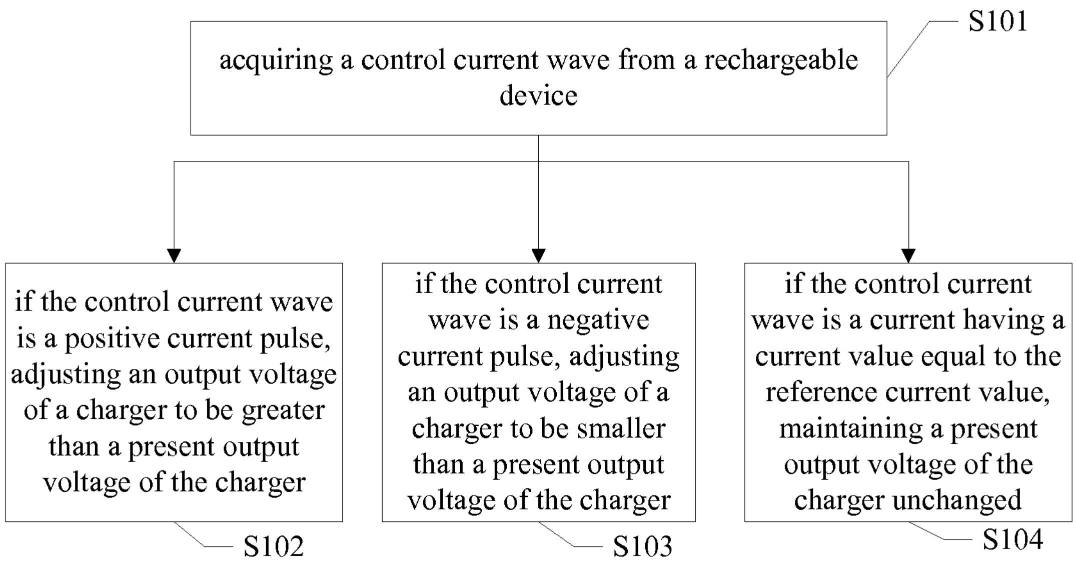
FIG. 1 schematically illustrates a flow chart of a charging method according to one embodiment of the present disclosure.

Referring to FIG. 1, a charging method is illustrated. The charging method includes four steps which are respectively from step S101 to step S104.

In step S101, acquiring a control current wave from a chargeable device.

In some embodiments of the present disclosure, the chargeable device may be any device configured with an apparatus adapted to store electric energy. In some embodiments of the present disclosure, the method may be implemented by a charger with a USB (Universal Serial Bus) port, thus the chargeable device communicates, such as exchanges information and transmits electric current, with the charger through the USB port. In some embodiments of the present disclosure, the chargeable device may be a mobile terminal or a tablet computer. In some embodiments of the present disclosure, the chargeable device may be a power bank or a mobile power device. In some embodiments of the present disclosure, the chargeable device may be other devices. The form of the chargeable device should not taken as a limitation of the present disclosure, as long as an apparatus adapted to store electric energy is included.

In some embodiments of the present disclosure, the control current wave is acquired by: the chargeable device sending the control current wave to the charger. The chargeable device is configured with a variable current source. Thus, through adjusting an output current of the variable current source, the control current wave having various current values can be obtained.

In some embodiments of the present disclosure, the charger is configured with a current detecting device, so as to obtain a current value of the control current wave output from the variable current source in the chargeable device. The current detecting device may be an ADC (Analog to Digital Converter), a comparator, or other devices, as long as the current value of the control current wave sent from the chargeable device can be obtained.

It can be understood that, in some embodiments of the present disclosure, the charger is also adapted to convert the control current wave, sent from the chargeable device, into a corresponding voltage. For example, the charger is configured with a resistor unit having a fixed resistance. Thus, through detecting a value of a voltage between two ends of the resistor unit, the current value of the control current wave sent from the chargeable device can be obtained.

In some embodiments of the present disclosure, the control current wave is sent from the chargeable device to the charger, wherein the control current wave is a positive electric current pulse, a negative electric current pulse, or a current which has a current value equal to a preset reference current value. The positive current pulse refers to a pulse which has a current value greater than the preset reference current value and lasts at least for a first preset time length T1. The negative current pulse refers to a pulse which has current value less than the preset reference current value and lasts at least for a second preset time length T2. The preset reference current value is greater than zero.

Figure 2:
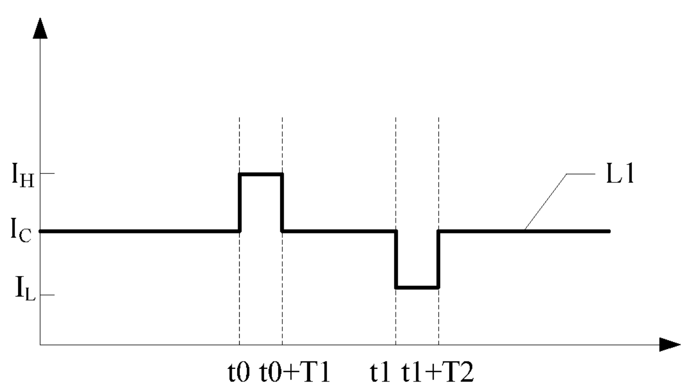
FIG. 2 schematically illustrates a wave form of a control current wave according to one embodiment of the present disclosure.

Referring to FIG. 2, a waveform of the control current wave according to one embodiment of the present disclosure is illustrated. In FIG. 2, L1 represents the waveform of the control current wave, $I_C$ represents a reference current value, $I_H$ represents a current value corresponding to a positive current pulse, and $I_L$ represents a current value corresponding to a negative current pulse.

It can be seen from FIG. 2, during a time period from 0 to t0, a current value of the control current wave is equal to the reference current value. During a time period from t0 to t0+T1, the current value of the control current wave is $I_H$. In other words, during the time period from t0 to t0+T1, the control current wave is the positive current pulse. During a time period from t0+T1 to t1, the current value of the control current wave returns to $I_c$. During a time period from t1 to t1+T2, the current value of the control current wave is $I_L$. In other words, during the time period from t1 to t1+T2, the control current wave is the negative current pulse.

In some embodiments of the present disclosure, when the control current wave is the positive current pulse, the step S102 is implemented; when the control current wave is the negative current pulse, the step S103 is implemented; and when the current value of the control current wave is equal to the reference current value, the step S104 is implemented.

Specifically, in step S102, if the control current wave is a positive current pulse, adjusting an output voltage of a charger to be greater than a present output voltage of the charger.

In some embodiments of the present disclosure, when the control current wave is the positive current pulse, it indicates that the chargeable device requires for increasing the output voltage of the charger. Further, the charger is configured to: adjust the output voltage thereof to be great than the present output voltage according to a preset voltage adjustment table.

In some embodiments of the present disclosure, a preset voltage adjustment table is provided. Thus, when the control current wave is the positive current pulse, a minimum value, in the preset voltage adjustment table, greater than the value of the present output voltage is taken as the adjusted output voltage of the charger. In other words, the output voltage of the charger is adjusted to the minimum value, in the preset voltage adjustment table, greater than the value of the present output voltage.

For example, in some embodiments of the present disclosure, referring to Table 1, a voltage adjustment table is illustrated.

TABLE 1

| | | | | | | | | | |
|---|---|---|---|---|---|---|---|---|---|
| 3.6 V | 3.8 V | 4.0 V | 4.2 V | 4.5 V | 5 V | 7 V | 9 V | 12 V | 15 V |

Supposing the present output voltage of the charger is 5V. The current value of the positive current pulse is 1.8 mA. The reference current value is 1.2 mA. The minimum value, in the preset voltage adjustment table, greater than the value of the present output voltage (e.g. 5V) is taken as the output voltage of the charger. From Table 1, it can be seen that, the minimum value greater than 5V is 7V. In other words, 7V is taken as the adjusted output voltage, and the charger adjusts the output voltage thereof into 7V.

In some embodiments of the present disclosure, if the control current wave is the positive current pulse, a subtraction is implemented to the current value of the positive current pulse and the reference current value, to obtain a first current value deviation Δ1. Furthermore, a first mapping table is provided, wherein the mapping table represents a mapping between current value deviations and adjusted voltage values. Therefore, through comparing the first current value deviation Δ1 with the current value deviations in the mapping table, a corresponding adjusted voltage can be selected to serve as the output voltage of the charger. It should be noted that, in the first mapping table, the current value deviations correspond to the present output voltage, the adjusted output voltage values are greater than the present output voltage.

For example, as shown in Table 2, a first mapping table is illustrated. The value of the present output voltage is taken as 5V for exemplary illustration.

TABLE 2

| Current Value Deviation | Present Voltage | Adjusted Output Voltage |
|---|---|---|
| 0.6 mA | 5 V | 7 V |
| 1.2 mA | 5 V | 9 V |
| 1.8 mA | 5 V | 12 V |

Supposing the current value of the positive current pulse is 2.4 mA, the reference current value is 1.2 mA, thus the first current value deviation Δ1 equals to 2.4 mA minus 1.2 mA, that is, 1.2 mA. According to Table 2, it can be seen that, the corresponding adjusted output voltage is 9V. For another example, supposing the current value of the positive current pulse is 1.8 mA, the reference current value is 1.2 mA, thus the first current value deviation Δ1 equals to 1.8 mA minus 1.2 mA, that is, 0.6 mA. According to Table 2, it can be seen that, the corresponding adjusted output voltage is 7V.

From Table 2, it can be seen that, an adjustment range of the output voltage (i.e. a difference between the present output voltage and the adjusted output voltage) enlarges with the increase of the first current value deviation between the current value of the positive current pulse and the reference current value. In other words, the adjustment range of the output voltage enlarges with the increase of the current value of the positive current pulse. Therefore, the value of the output voltage of the charger can be elevated rapidly by increasing the current value of the positive current pulse.

In some embodiment of the present disclosure, other ways known by person in the art may be employed to adjust the output voltage of the charger, which will not be described in detail herein.

In step S103, if the control current wave is a negative current pulse, adjusting an output voltage of a charger to be less than a present output voltage of the charger.

In some embodiments of the present disclosure, when the control current wave is the negative current pulse, it indicates that the chargeable device requires for reducing the output voltage of the charger. And, the charger is adapted to adjust the output voltage thereof to be less than the present output voltage value according to a preset voltage adjustment table.

In some embodiments of the present disclosure, the preset voltage adjustment table is as Table 1 illustrated above, according to which the output voltage of the charger can be determined. For example, supposing the value of the present output voltage of the charger is 5V, the current value of the negative current pulse is 0.6 mA, and the reference current value is 1.2 mA. Thus, the current value of the negative current pulse is less than the reference current value. The maximum value, in the preset voltage adjustment Table 1, less than the present output voltage value (e.g. 5V) is taken as the output voltage of the charger. From Table 1, it can be seen that, the maximum value less than 5V is 4.5V. In other words, 4.5V is taken as the output voltage, and the charger adjusts the output voltage thereof to 4.5V.

In some embodiments of the present disclosure, when the control current wave is the negative current pulse, a subtraction is implemented to the current value of the negative current pulse and the reference current value, to obtain a second current value deviation Δ2. Furthermore, a second mapping table is established, wherein the second mapping table indicates a mapping between current value deviations and adjusted voltage values. Therefore, through comparing the second current value deviation Δ2 with the current value deviations in the second mapping table, a corresponding adjusted voltage value can be selected to serve as the output voltage of the charger. It should be noted that, in the first mapping table, the current value deviations correspond to the present output voltage, the adjusted output voltage values are less than the present output voltage.

For example, as shown in Table 3, a second mapping table is illustrated. The value of the present output voltage is taken as 5V for exemplary illustration.

TABLE 3

| Current Value Deviation | Present Voltage | Adjusted Output Voltage |
|---|---|---|
| 0.3 mA | 5 V | 4.5 V |
| 0.6 mA | 5 V | 4.2 V |
| 0.9 mA | 5 V | 4.0 V |

Supposing the current value of the negative current pulse is 0.9 mA, the reference current value is 1.2 mA, thus the second current value deviation Δ2 equals to 1.2 mA minus 0.9 mA, that is, 0.3 mA. According to Table 3, it can be seen that, the corresponding adjusted output voltage is 4.5V. Similarly, supposing the current value of the negative current pulse is 0.6 mA, the reference current value is 1.2 mA, thus the second current value deviation Δ2 equals to 1.2 mA minus 0.6 mA, that is, 0.6 mA. According to Table 3, it can be seen that, the corresponding adjusted output voltage is 4.2V.

From Table 3, it can be seen that, the adjustment range of the output voltage (i.e. a difference between the present output voltage and the adjusted output voltage) enlarges with the increase of the deviation between the current value of the negative current pulse and the reference current value. In other words, the adjustment range of the output voltage enlarges with the decrease of the current value of the negative current pulse. Therefore, the value of the adjusted output voltage of the charger can be reduced rapidly by decreasing the current value of the negative current pulse.

It should be noted that, the present voltage of the charger may be other values other than 5V. Further, a corresponding mapping relation between the current value deviations and the adjusted output voltage values can be determined according to practical requirements, which is not limited by the present disclosure, as long as the value of the adjusted output voltage decreases with the increase of the current value deviation.

In step S104, if a current value of the control current wave is equal to the reference current value, maintaining the present output voltage of the charger unchanged.

It can be seen that, the output voltage of the charger is adjusted based on the control current wave sent from the chargeable device to the charger, wherein the control current wave may be the positive current pulse or the negative current pulse. Specifically, if the control current wave is the positive current pulse, the output voltage of the charger is adjusted to be greater than the present output voltage of the charger; and if the control current wave is the negative current pulse, the output voltage of the charger is adjusted to be less than the present output voltage value of the charger. Accordingly, an adjustment to the output voltage of the charger is achieved. Furthermore, with the increase of the output voltage of the charger, a power of the charger is increased. Correspondingly, an effective current input into the chargeable device (specifically, the apparatus therein adapted to store electric energy, such as a battery) is increased. In other words, the current input into the chargeable device is increased. Therefore, an output capability of the charger can be sufficiently used, thus achieving fast charging.

When the chargeable device is charged in a linear way, the output voltage of the charger is correspondingly reduced by receiving a negative current wave sent from the chargeable device. In this case, if the output current of the charger keeps constant, a difference between the adjusted output voltage of the charger and the present voltage of the chargeable device (specifically, the apparatus of the chargeable device adapted to store electric energy, such as a battery) can be shrank by reducing the output voltage of the charger. Accordingly, a power loss of a charging circuit during the charging process can be effectively reduced.

In some embodiments of the present disclosure, before sending the control current wave to the charger, the chargeable device sends a detecting current to the charger, so as to detect if the charger is suitable for receiving the control current wave from the chargeable device. If the charger is detected, by the chargeable device, having a voltage drop after receiving the detecting current for a time period which reaches a preset value, the charger is determined as suitable for receiving the control current wave. In this case, the charger is defined as in a state ready for receiving the control current wave.

It can be seen that, the charger enters into the state for receiving the control current wave, after being detected of receiving the detecting current for a time period which reaches a preset value. In this case, the charger sends a feedback signal to the chargeable device. The chargeable device sends the control current wave to the charger after the feedback signal is received, thus adjusting the output voltage of the charger. As such, a false operation caused by noise interference can be avoided.

Accordingly, during the charging process, the output voltage of the charger is adjusted. When the charging process is finished, such as when the chargeable device and the charger are disconnected, the output voltage of the charger may be in a high value. For example, when the chargeable device and the charger are disconnected, the output voltage of the charger is 12V. However, when using this charger, which has an output voltage of 12V, to charge another chargeable device, for example, to charge a chargeable device which has a nominal input voltage of 5V, the charging process may unable to be implement, or even cause damage to the chargeable device.

Figure 3:
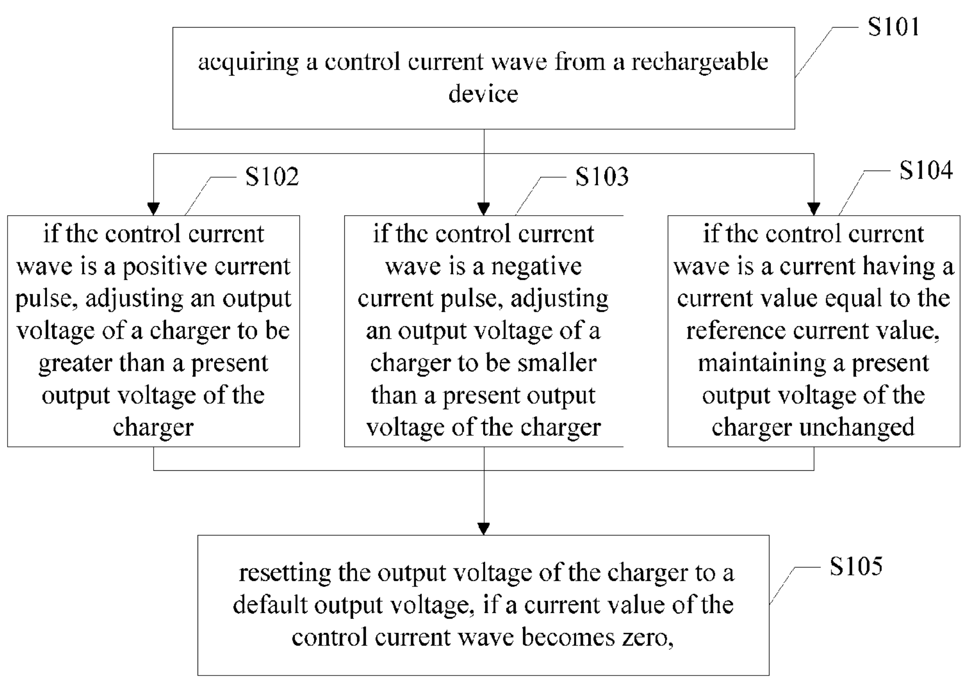
FIG. 3 schematically illustrates a flow chart of the charging method according to another embodiment of the present disclosure.

In order to solve the problem recited above, another charging method is provided by the present disclosure, as shown in FIG. 3. The charging method further includes a step S105 after step S102 or step S103, in comparison with the method shown in FIG. 1.

In step S105, resetting the output voltage of the charger to a default output voltage if a current value of the control current wave becomes zero.

In some embodiments of the present disclosure, when the charging process is finished, such as the chargeable device and the charger are disconnected or the charger is unplugged from the chargeable device, the chargeable device can not send the control current wave to the charger any more. In other words, the current value of the control current wave, received by the charger from the chargeable device, becomes zero. In this case, the output voltage of the charger is reset to a default output voltage.

For example, before the chargeable device is unplugged from the charger, the output voltage of the charger is adjusted to 12V base on the control current wave from the chargeable device. When the current value of the control current wave from the chargeable device and received by the charger becomes zero, which means that the chargeable device is unplugged from the charger, the output voltage of the charger is reset to the default output voltage of 5V.

It can be seen that, when the current value of the control current wave sent from the chargeable device is zero, it can be concluded that the chargeable device does not send the control current wave to the charger any more, the chargeable device is taken as unplugged from the charger. In this case, the output voltage of the charger is reset to the default output voltage. As such, when using the charger to charging another chargeable device, a mismatching between the output voltage of the charger and the nominal voltage of the chargeable device can be avoided. Therefore, damages to the chargeable device, when the output voltage of the charger is high, can be avoided. Or, failing to charge the chargeable device, when the output voltage of the charger is low, can be avoided.

Figure 4:
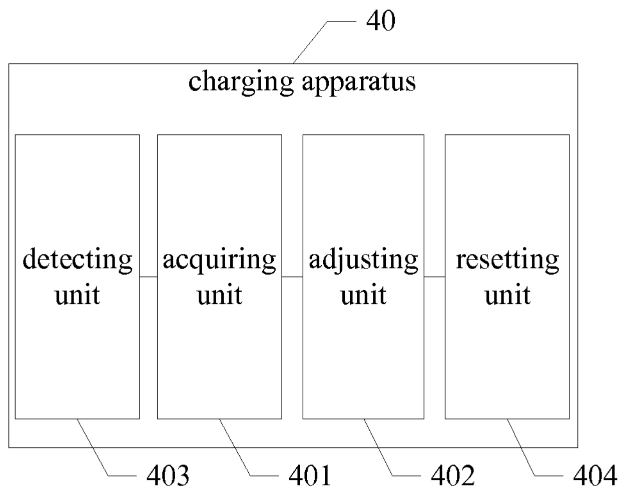
FIG. 4 schematically illustrates a structure of a charging apparatus according to one embodiment of the present disclosure.

Referring to FIG. 4, a charging apparatus 40 is provided, which includes an acquiring unit 401 and an adjusting unit 402.

The acquiring unit 401 is configured to acquire a control current wave from a chargeable device. The adjusting unit 402 is configured to: if the acquired control current wave is a positive current pulse, adjusting an output voltage of a charger to be greater than a present voltage of the charger; and if the acquired control current wave is a negative current pulse, adjusting the output voltage of the charger to be less than the present voltage of the charger.

The positive current pulse refers to a pulse which has a current value greater than the preset reference current value and lasts at least for a first preset time length T1. The negative current pulse refers to a pulse which has a current value less than the preset reference current value and lasts at least for a second preset time length. The preset reference current value is greater than zero.

In some embodiments of the present disclosure, the charging apparatus further includes a resetting unit 404 which is configured to: reset the output voltage of the charger into a default voltage value if a current value of the control current wave becomes zero.

Figure 5:
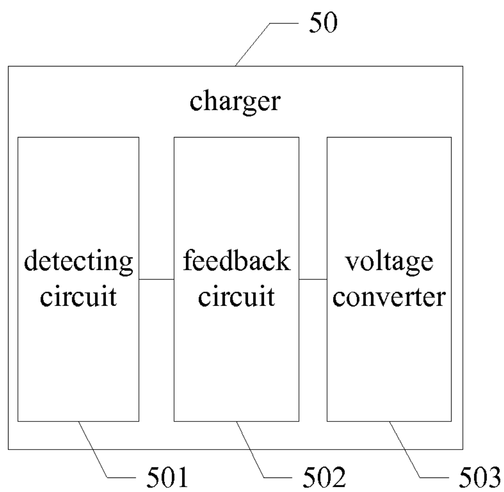
FIG. 5 schematically illustrates a structure of a charger according to one embodiment of the present disclosure.

Referring to FIG. 5, a charger 50 according to one embodiment of the present disclosure is illustrated. The charger 50 includes: a detecting circuit 501, a feedback circuit 502, and a voltage converter 503, wherein the detecting circuit 501 includes a comparing unit and a resistor.

In some embodiments of the present disclosure, the resistor has a first end coupled with a current input port of the charger 50 and a second end coupled with ground. As the first end of the resistor is coupled with the current input port of the charger, when a chargeable device inputs a current to the charger 50, a voltage drop is generated in the resistor. The current input into the charger 50 by the chargeable device is I, the resistor has a resistance of R, the voltage drop generated in the resistor is U, wherein U=I×R. For example, when the resistor has a resistance of 1KΩ, and the current input to the charger 50 by the chargeable device is 0.6 mA, then the voltage drop generated in the resistor is 0.6V.

The comparing unit includes at least three comparators which have different threshold values. Each of the at least three comparators has a first input terminal and a second input terminal, wherein the first input terminals of the comparators are input with the voltage drop of the resistor, and the second input terminals of the comparators are respectively input with the threshold values thereof. Further, the first input terminals and the second input terminals are all coupled with the feedback circuit 502.

In some embodiments of the present disclosure, the comparing unit includes three comparators which have different threshold values. First input terminals of the three comparators are all input with the voltage drop in the resistor, and second input terminals of the three comparators are respectively input with the corresponding threshold values thereof. Each of the three comparators is configured to implement a comparison between the value of the voltage drop in the resistor and the corresponding threshold value, thus outputting a comparison result via an output port, wherein the comparison result is input into the feedback circuit 502.

For example, the three comparators are respectively a comparator A1, a comparator A2, and a comparator A3, wherein the comparator A1 has a threshold value of 0.3V, the comparator A2 has a threshold value of 0.9V, and the comparator A3 has a threshold value of 1.5V. When a value of the voltage input into the first input terminal of the comparator is greater than that input into the second input terminal thereof, the comparison result output from the comparator is "1". When the value of the voltage input into the first input terminal of the comparator is less than that input into the second input terminal thereof, the comparison result output from the comparator is "0".

Further, the resistor has a resistance of 1KΩ, the control current wave input into the charger from the chargeable device has a current value equal to that of the reference current value which is 1.2 mA, thus the voltage drop in the resistor is 1.2V. The first input terminal of the comparator A1 is input with a voltage of 1.2V, the second input terminal of the comparator A1 is input with a voltage of 0.3V, which means the value of the voltage input into the first input terminal is greater than that of the voltage input into the second input terminal. The first input terminal of the comparator A2 is input with a voltage of 1.2V, the second input terminal of the comparator A2 is input with a voltage of 0.9V, which means the value of the voltage input into the first input terminal is greater than that of the voltage input into the second input terminal. The first input terminal of the comparator A3 is input with a voltage of 1.2V, the second input terminal of the comparator A3 is input with a voltage of 1.5V, which means the value of the voltage input into the first input terminal is less than that of the voltage input into the second input terminal. Accordingly, the comparison results output from the three comparators A1, A2, and A3 are respectively 1, 1, and 0 which are sent to the feedback circuit 502.

Similarly, if the chargeable device inputs a positive current wave to the charger, wherein the positive current wave has a current value of 1.8 mA, then the voltage drop in the resistor is 1.8V. Accordingly, all the three comparators output a high level. In other words, the comparison results output from the three comparators are respectively 1, 1, and 1. If the chargeable device inputs a negative current wave to the charger, wherein the negative current wave has a current value of 0.6 mA, then the voltage drop in the resistor is 0.6V. Accordingly, the comparison results output from the three comparators A1, A2, and A3 are respectively 1, 0, and 0.

It can be understood that, in other embodiments of the present disclosure, the comparing unit may include other number of comparators, wherein the number of the comparators is an integer greater than 3. The comparators are configured: having different threshold values; when a value input into the first input terminal is greater than that input into the second input terminal, outputting a high level "1"; and when a value input into the first input terminal is less than that input into the second input terminal, outputting a low level "0".

The feedback circuit 502 is disposed between the detecting circuit 501 and the voltage converter 503. The feedback circuit 502 is configured to: convert the comparison results output from the comparators in the comparing unit into control signals; and send the control signals to the voltage converter 503, wherein the comparators have different threshold values.

For example, in some embodiments of the present disclosure, the comparison results of the comparators are respectively 1, 1, and 0. During a period of time, if within the time length T1, the comparison results of the comparators are detected to be 1, 1, 1, then the control current wave is determined as the positive current pulse. According to the preset voltage adjustment table (Table 1), if the output voltage of the charger is currently 5V, then the output voltage of the charger is adjusted to 7V. Therefore, the feedback circuit 502 sends a control signal which has a voltage of 7V to the voltage converter 503.

In some embodiments of the present disclosure, for example, if within the time length T2, the comparison results of the comparators are detected to be 1, 0, 0, then the control current wave is determined as the negative current pulse. According to the preset voltage adjustment table (Table 1), if the output voltage of the charger is currently 5V, then the output voltage of the charger is adjusted to 4.5V. Therefore, the feedback circuit 502 sends a control signal which has a voltage of 4.5V to the voltage converter 503.

The voltage converter 503, which is coupled with the comparing unit, is adapted to adjust the output voltage of the charger.

In some embodiments of the present disclosure, the voltage converter 503 is configured to: when a control signal from the feedback circuit 502 is received, obtain an output voltage of the charger corresponding to the control signal; and adjust the charger to the obtained output voltage.

For example, when the voltage converter 503 receives a control signal from the feedback circuit 502, wherein the control signal indicates that the output voltage of the charger corresponding to the current control current wave is 7V, then the voltage converter 503 adjusts the output voltage of the charger into 7V.

In some embodiments of the present disclosure, the voltage converter 503 may be an AC-DC (Alternating Current to Direct Current) converter, or a DC-AC (Direct Current to Alternating Current) converter. When the voltage converter 503 is the AC-DC converter, for safety sake, an isolator may be disposed between the AC-DC converter and the detecting circuit 501. The isolator is adapted to physically isolate the AC-DC converter and the detecting circuit 501, so as to avoid dangers caused by accidentally touching the detecting circuit 501. In some embodiments of the present disclosure, the isolator is part of the feedback circuit. In other words, the feedback circuit includes the isolator.

In some embodiments of the present disclosure, the isolator is an optical coupling device. In some embodiments of the present disclosure, the isolator may be configured into other devices, as along as the AC-DC converter and the detecting circuit 501 can be physically isolated from each other. Herein, the configuration of the isolator will not be described in detail.

In some embodiments of the present disclosure, the detecting circuit 501 further includes: a logic controller and a switching unit.

The logic controller, which is coupled with the output terminals of the comparators, is configured to: receive the comparison results from the comparators; start recording time when a first number of comparators output a high level, where the first number reaches a preset value. In other words, when the first number of comparators, whose threshold value is less than the value of the voltage drop of the resistor, reaches a preset value, start recording time. The logic controller is further configured to: when the recorded time reaches a preset time length, switch on the switching unit, thus a resistance of the resistor is reduced and the voltage drop is reduced; and send a feedback signal to the chargeable device to inform the chargeable device that the charger is suitable for receiving a control current wave, wherein the feedback signal is a voltage drop signal of the resistor.

The switching unit, which is coupled with the logic controller, is configured to: when being switched on, reduce the resistance of the resistor.

In some embodiments of the present disclosure, the comparing unit includes three comparators which are respectively a comparator A1, a comparator A2, and a comparator A3. When the number of the comparators which output a high level meets a preset requirement, such as, comparison results of at least two of the three comparators is “1”, the logic controller starts recording time. Further, when the recorded time reaches the preset time length, the logic controller sends a control instruction to the switching unit, so as to switch on the switching unit. When the switching unit is switched on, a portion of the resistor is shorted, thus the resistance of the resistor is reduced. Moreover, when the switching unit is switched on, the comparison result of at least one comparator is “1”. Accordingly, the voltage drop of the resistor is reduced, wherein a voltage drop signal of the resistor serves as a feedback signal and is sent to the chargeable device. The feedback signal is used to inform the chargeable device that the charger is suitable for receiving a control current wave.

In some embodiments of the present disclosure, the switching unit is a MOS (Metal Oxide Semiconductor) transistor. For example, the switching unit may be a NMOS transistor or a PMOS transistor. The switching unit may be a triode or an electric relay. The switching unit may be configured into other devices or circuits, as long as the switch function can be achieved and the resistance of the resistor can be reduced when being switched on.

Figure 6:
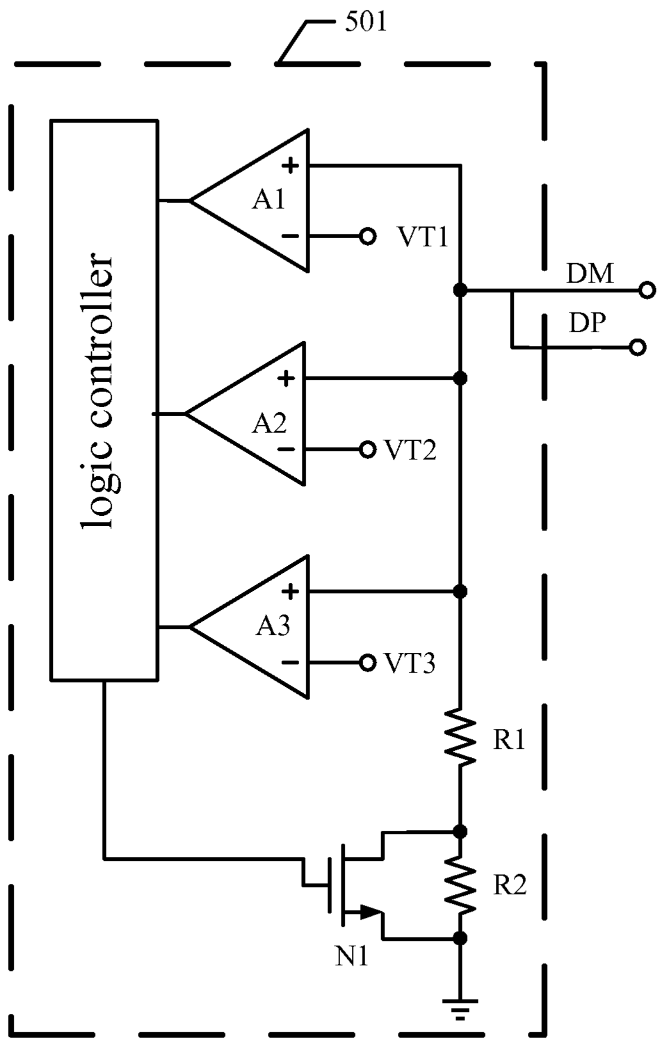
FIG. 6 schematically illustrates a structure of a detecting circuit according to one embodiment of the present disclosure.

Referring to FIG. 6, a structure of a detecting circuit 501 according to one embodiment of the present disclosure is illustrated.

As shown in FIG. 6, the resistor includes a first resistor R1, and a second resistor R2. A1, A2, and A3 are three comparators of the comparing unit, wherein threshold values of A1, A2, and A3 are different. Specifically, the threshold value of the comparator A1 is VT1, the threshold value of the comparator A2 is VT2, and the threshold value of the comparator A3 is VT3, wherein VT1<VT2<VT3. NMOS transistor N1 is the switching unit.

The charger is connected with the chargeable device through a USB (universal serial bus) cable, so as to charge the chargeable device. During the charging process, the chargeable device is adapted to send a detecting current and a control current wave to the charger via a DM pin. Before sending the control current wave to the charger, the chargeable device sends the detecting current to the charger, so as to detect if the charger is adapted to receive the control current wave, currently.

The chargeable device sends the detecting current $I_0$ to the charger through a variable current source. Herein, a value of the detecting current $I_0$ is taken as equal to that of the referring current $I_c$, for easy illustration. The voltage drop of the resistor is $U_0$, wherein $U_0=I_0\times(R1+R2)$, and $VT3<U_0$, thus the comparison results of the comparators A1, A2 and A3 are all high level “1”.

When the logic controller receives the comparison results of the three comparators, as the comparison results of the three comparators are all high level “1”, the logic controller starts recording time. When the recorded time reaches a preset time length, such as 1s, the logic controller sends a control signal to a gate of the NMOS transistor N1, so as to switch on the NMOS transistor N1.

The second resistor R2 is coupled with a source and a drain of the NMOS transistor N1, thus when the NMOS transistor N1 is switched on, the second resistor R2 is shorted. In this case, a voltage drop in the charger corresponding to the detecting current is U', wherein $U'=I\times R1$, and $VT2<U'<VT3$. Therefore, after the second resistor R2 is shorted, two of the comparators output high level.

As the charger is connected with the chargeable device, when the voltage drop in the detecting circuit 501 is reduced, that is, a voltage on the DM/DP pin is reduced to U', correspondingly, a voltage on the DM/DP pin of the chargeable device is also reduced to U'. Accordingly, it can be determined that, the charger currently connected is adapted to receive a control current wave. In other words, the chargeable device can send control current wave to the charger.

Thereafter, the chargeable device sends the control current wave to the charger, wherein a current value corresponding to the control current wave is I. Thus, a voltage drop in the detecting circuit $U=I\times R1$.

When the current value of the control current wave output from the chargeable device is equal to that of the reference current $I_1$, the comparison results output from the comparators A1, A2, and A3 are respectively 1, 1, and 0. When the control current wave output from the chargeable device is a positive current pulse, the comparison results output from the comparators A1, A2, and A3 are respectively 1, 1, and 1. When the control current wave output from the chargeable device is a negative current pulse4, the comparison results output from the comparators A1, A2, and A3 are respectively 1, 0, and 0.

A voltage currently output from the charger is detected, by the chargeable device, as being 5V, which does not meet the requirement of fast charging. Thus, the output voltage of the charger is required to be raised. If the control current wave from the chargeable device to the charger is the positive current pulse, all the comparators A1, A2, and A3 output the high level. In other word, the comparison results of the comparators are respectively 1, 1, and 1. According to Table 1, the voltage converter adjusts the output voltage of the charger into 7V.

If the output voltage of 7V still can not meet the requirement of fast charging, the chargeable device keeps sending the positive current pulse to the charger. Thus, all the comparators A1, A2, and A3 output the high level. Further, the present voltage of the charger is 7V. According to Table 1, the voltage converter adjusts the output voltage of the charger into 9V. By such way, the output voltage of the charger can be adjusted to a desired value.

Similarly, the output voltage of the charger can be reduced referring to the way recited above. For example, a present voltage of the charger is 5V, the control current wave from the chargeable device to the charger is a negative current pulse, only the comparator A1 outputs the high level. According to Table 1, the voltage converter adjusts the output voltage of the charger into 4.5V. Keep sending the negative current pulse, only the comparator A1 outputs the high level. Thus, according to Table 1, the voltage converter adjusts the output voltage of the charger into 4.2V. By such way, the output voltage of the charger can be adjusted to a desired value.

It can be understood that, in some embodiments of the present disclosure, when the output voltage of the charger is adjusted by the control current wave from the chargeable device, the voltage converter can be configured to: raise the output voltage of the charger, when multiple positive current pulses are continuously received by the charger; or reduce the output voltage of the charger, when multiple negative current pulses are continuously received by the charger. In some embodiments of the present disclosure, other ways may be employed to adjust the output voltage of the charger according to the positive current pulse and the negative current pulse, which are not described in detail.

Figure 7:
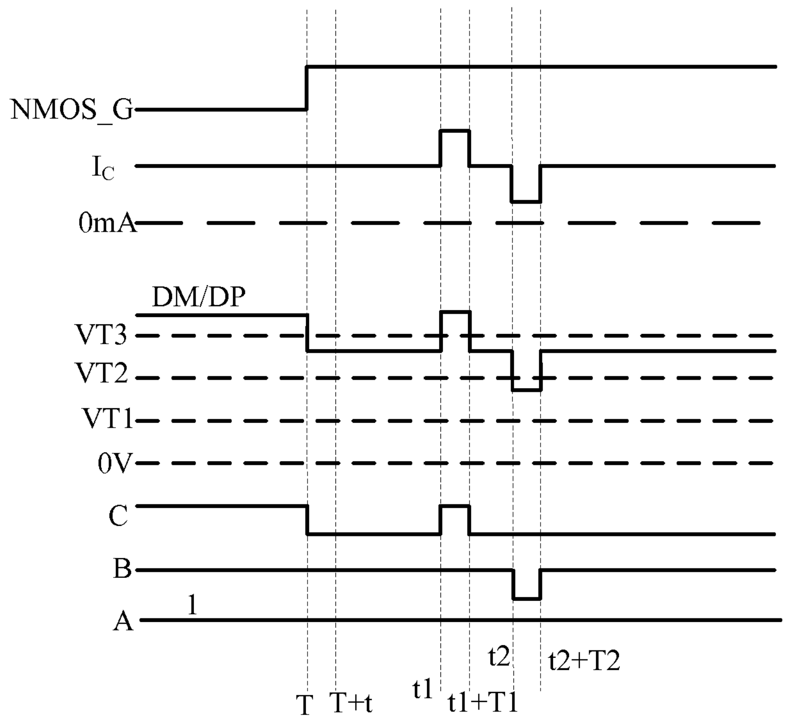
FIG. 7 schematically illustrates a working time sequence of a charger according to one embodiment of the present disclosure.

Referring to FIG. 7, a timing sequence of a charger according to one embodiment of the present disclosure is illustrated. In FIG. 7, NMOS_G indicates an electric level of the gate G of the NMOS transistor N1, $I_c$ indicates a value of the current wave output from the variable current source, wherein $I_c$>0 mA by default. DM/DP indicates a voltage drop corresponding to the resistor of the detecting circuit of the charger. VT1 to VT3 indicate threshold values of the comparators A1 to A3, respectively. T indicates a preset time. C indicates an electrical level output from the comparator A3. B indicates an electrical level output from the comparator A2. A indicates an electrical level output from the comparator A1.

Referring to FIG. 6 and FIG. 7, during a time period from 0 to T, a value of a current sent from the chargeable device is equal to that of the detecting current $I_0$. In the charger, a value of the voltage drop DM/DP corresponding to the detecting current $I_0$ is greater than that of the threshold value VT3 of the comparator A3, that is, comparison results of the comparators are all high level, thus the logic controller starts recording time. When the time recorded by the logic controller reaches the preset time length T, the logic controller sends a high level signal to the gate G of the NMOS transistor N1. Thus, the NMOS transistor N1 is switched on, R2 is shorted, and DM/DP voltage is drew down to a value lager than that of VT2 and less than that of the VT3. Accordingly, the charger enters into a state of ready for receiving a control current wave sent from the chargeable device.

After a time point of T+t, the chargeable device sends the control current wave. During the time period of T+t to t1, a current value of the control current wave is equal to that of the referring current, and the DM/DP voltage has a value between VT2 and VT3. During the time period of t1 to t1+T1, the chargeable device sends a positive current pulse, DM/DP voltage is raised up, the comparison results of the comparators are respectively 1, 1, 1, thus a voltage output from the charger is raised.

At the time point of t1+T1, the value of the current control wave sent from the chargeable device is equal to that of the referring current, the comparison results of the comparators are respectively 1, 1, 0, and the voltage output from the charger stays the same. During the time period of t2 to t2+T2, the chargeable device sends a negative current pulse, DM/DP voltage is drew down, the comparison results of the comparators are respectively 1, 0, 0, thus a voltage output from the charger is reduced.

As shown in FIG. 7, it can be concluded that, when the chargeable device sending the negative current pulse, the voltage drop of the detecting circuit still greater than VT1. Further, when the chargeable device and the charger are disconnected, the voltage drop of the detecting circuit is less than VT1. Thus, when the voltage drop of the detecting circuit is detected less than VT1, it can be determined that the chargeable device and the charger are disconnected from each other.

Accordingly, whether the chargeable device and the charger are disconnected can be determined via the way recited above.

In some embodiments of the present disclosure, the number of the comparators may be any other integers greater than three, such as four or five. In one embodiment of the present disclosure, the number of the comparators is taken as five for exemplary illustration of the detecting unit 501.

Figure 8:
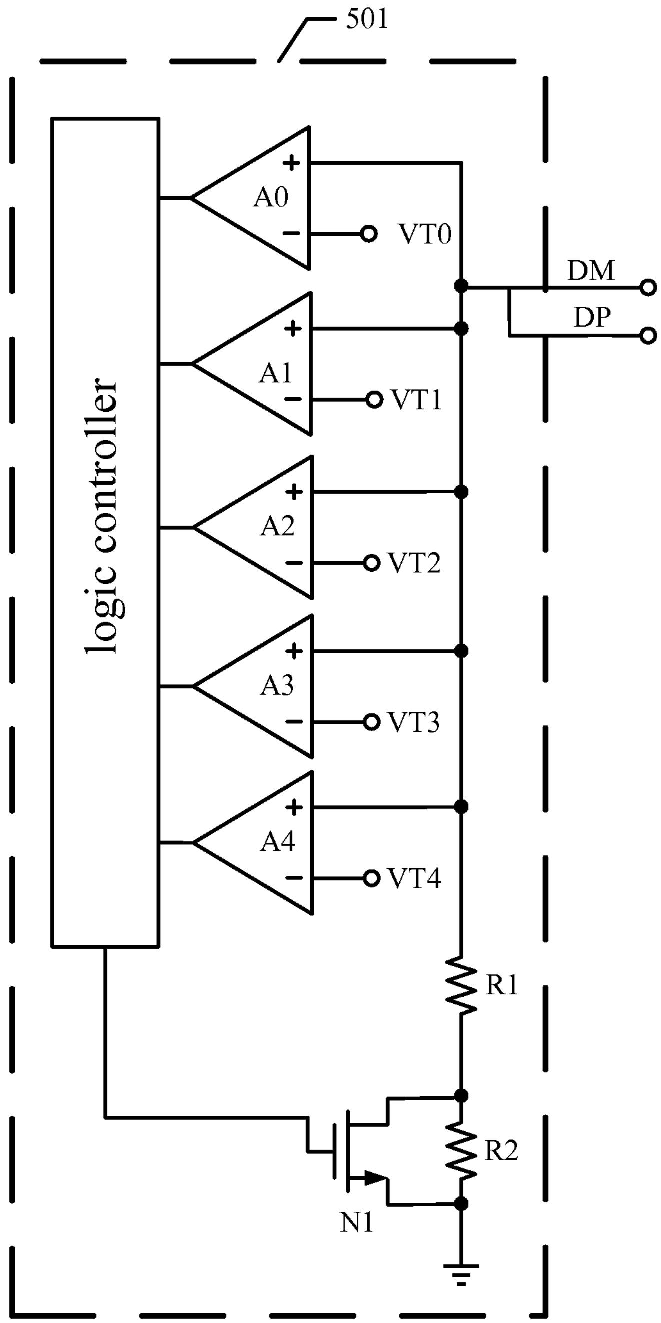
FIG. 8 schematically illustrates a structure of a detecting circuit according to another embodiment of the present disclosure.

Referring to FIG. 8, a structure of a detecting unit 501 according to another embodiment of the present disclosure is illustrated. In comparison with the detecting unit shown in FIG. 6, the detecting unit 501 includes two more comparators A0 and A4. The five comparators are respectively indicated as A0 to A4, a threshold value of the comparator A0 is VT0, and a threshold value of the comparator A4 is VT4, and VT0<VT1<VT2<VT3<VT4.

The chargeable device sends a detecting current $I_0$ to the charger through a variable current source. A voltage drop of the resistor is $U_0$, wherein $U_0=I_0\times(R1+R2)$, and $U_0>VT3$. Thus, at least comparison results of the comparators A0, A1, A2, and A3 are high level.

When at least four of comparison results of the five comparators received are high level, the logic controller starts to time. When a time length time reaches the preset time length T, a gate of a NMOS transistor N1 sends a control signal, so as to switch on the NMOS transistor N1.

When the NMOS transistor N1 is switched on, a resistor R2 is shorted. Thus, a voltage drop corresponding the detecting current is U', wherein $U'=I_0\times R1$, and $VT1<U'<VT2$. In this case, the comparison results of the five comparators are respectively 1, 1, 0, 0, and 0. When the chargeable device determines that the charger it connected with is adapted to receive the control current wave, the chargeable device sends the control current wave to the charger. The control current wave has a value of I, the detecting unit has a voltage drop of U, wherein U=I×R1.

Supposing that, when the value of the control current wave sent by the chargeable device is equal to that of the referring current, the comparison results of the comparators are respectively 1, 1, 1, 0, 0; when the control current wave sent by the chargeable device is a positive current pulse, the comparison results of the comparators are respectively 1, 1, 1, 1, 0 or 1, 1, 1, 1, 1; and when the control current wave sent by the chargeable device is a negative current pulse, the comparison results of the comparators are respectively 1, 1, 0, 0, 0 or 1, 0, 0, 0, 0.

Referring to Table 4, a third mapping table according to one embodiment of the present disclosure is illustrated, wherein the third mapping table represents mapping between comparison results and adjusted output voltages.

TABLE 4

| Comparison Results | Present Voltage | Adjusted Output Voltage |
|---|---|---|
| 1, 1, 1, 1, 1 | 5 V | 12 V |
| 1, 1, 1, 1, 0 | 5 V | 9 V |
| 1, 1, 1, 0, 0 | 5 V | 5 V |
| 1, 1, 0, 0, 0 | 5 V | 4.5 V |
| 1, 0, 0, 0, 0 | 5 V | 4.2 V |

Fox example, supposing the present voltage output from the charger is 5V, the chargeable device sends the control current wave to the charger, and if the comparison results output from the comparators are 1, 1, 1, 1, 0, then the voltage output from the charger is raised to 9V. If the comparison results output from the comparators are 1, 1, 1, 1, 1, then the voltage output from the charger is raised to 12V. In other words, the larger the value of the positive current wave sent from the chargeable device, the more the voltage output from the charger is raised.

For another example, supposing the present voltage output from the charger is 5V, the chargeable device sends the control current wave to the charger, and if the comparison results output from the comparators are respectively 1, 1, 0, 0, 0, then the voltage output from the charger is reduced to 4.5V. If the comparison results output from the comparators are 1, 0, 0, 0, 0, then the voltage output from the charger is reduced to 4.2V. In other words, the larger the value of the negative current wave sent from the chargeable device, the more the voltage output from the charger is reduced.

Figure 9:
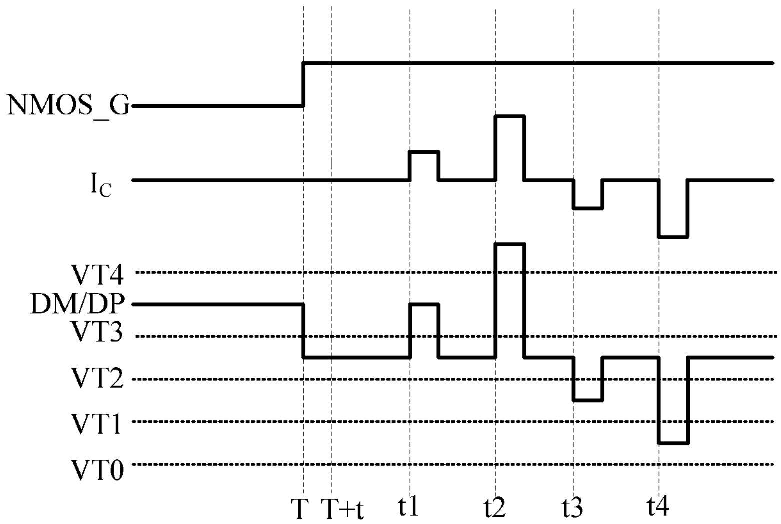
FIG. 9 schematically illustrates a working time sequence of a charger according to another embodiment of the present disclosure.

Referring to FIG. 9, a timing sequence of a charger according to one embodiment of the present disclosure is illustrated. In FIG. 9, NMOS_G indicates an electric level of the gate G of the NMOS transistor N1, Ic indicates a value of the current wave output from the variable current source, wherein $I_c$>0 mA by default. DM/DP indicates a voltage drop corresponding to the resistor of the detecting circuit of the charger. VT0 to VT4 indicate threshold values of the comparators A0 to A4, respectively. T indicates a preset time.

Referring to FIG. 8 and FIG. 9, during a time period from 0 to T, a value of a current $I_c$ sent from the chargeable device is equal to that of the detecting current $I_0$. In the charger, a value of the voltage drop DM/DP corresponding to the detecting current $I_0$ is greater than that of the threshold value VT3 of the comparator A3, the logic controller starts recording time. When the time recorded by the logic controller reaches the preset time length T, the logic controller sends a high level signal to the gate G of the NMOS transistor N1. Thus, the NMOS transistor N1 is switched on, R2 is shorted, and the value of DM/DP is drew down to a value lager than that of VT1 and less than that of the VT2. Accordingly, the charger enters into a state of ready for receiving a control current wave sent from the chargeable device.

At a time point of T+t, the value of DM/DP is detected by the chargeable device as being changed, and the chargeable device sends the control current wave to the charger, wherein the control current wave has a value equal to that of the referring current. In this case, the value of DM/DP is between the value of the VT2 and the value of the VT3.

At a time point of t1, the chargeable device sends a positive current wave, the value of DM/DP is greater than the value of the VT3 and less than the value of the VT4, thus the comparison results of the comparators are respectively 1, 1, 1, 1, and 0. Therefore, according to the preset mapping table, the voltage output from the charger can be obtained. For example, according to Table 4, when the present voltage output from the charger is 5V, the voltage output from the charger corresponding to the comparison results 1, 1, 1, 1, 0 is 9V.

At a time point of t2, the chargeable device sends the positive current pulse, the comparison results of the comparators are respectively 1, 1, 1, 1, 0. At a time point of t3, the chargeable device sends a negative current pulse, the comparison results of the comparators are respectively 1, 1, 0, 0, 0. At a time point of t4, the chargeable device sends the negative current pulse, the comparison results of the comparators are respectively 1, 0, 0, 0, 0. According to Table 4, the voltage of the charger can be obtained.

Figure 10:
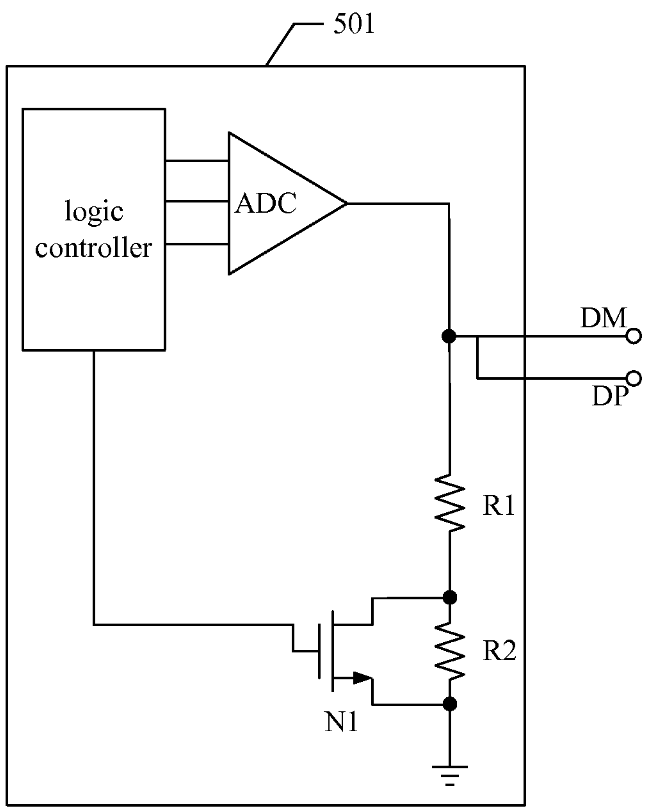
FIG. 10 schematically illustrates a structure of a detecting circuit according to another embodiment of the present disclosure.

It can be understood that, in some embodiments of the present disclosure, the comparing unit in the detecting circuit 501 is replaced by an ADC (Analog-Digital Conversion) circuit. Referring to FIG. 10, another structure of the detecting circuit 501 is illustrated.

In FIG. 10, the chargeable device is adapted to sends a detecting current $I_0$ to the charger, thus a voltage drop of the resistor is $U_0$, wherein $U_0=I_0\times(R1+R2)$.

The ADC circuit is configured to collect the voltage drop $U_0$ of the resistor, and send the collected voltage drop to a logic controller. The logic controller is configured to: compare a value of the voltage drop $U_0$ collected by the ADC circuit and a preset voltage value; and when the value voltage drop $U_0$ is greater than the preset voltage value, start recording time. Furthermore, when the time recorded by the logic controller reaches a preset time length, such as 1s, a high level signal is sent to the gate of the NMOS transistor N1, so as to switch on the NMOS transistor N1.

In some embodiments of the present disclosure, the preset voltage value is equal to that of VT1. In other words, when the value of the voltage drop $U_0$ of the resistor sent by the ADC circuit and obtained by the logic controller is greater than that of VT3, that is $U_0=I_0\times(R1+R2)>VT3$, the logic controller starts to time.

The second resistor R2 is coupled with the source and the drain of the NMOS transistor N1, thus when the NMOS transistor N1 is switched on, the second resistor R2 is shorted. In this case, the voltage drop corresponding to the detecting current is U', wherein $U'=I_0\times R1$, and $VT2<U'<VT3$.

As the charger and the chargeable device are connected, when the voltage drop of the detecting circuit is reduced, that is, the voltage on the DM/DP pin of the charger is reduced to U', the voltage on the DM/DP pin of the chargeable device is reduced to U' as well. In this case, the charger currently connected is adapted to receive the control current wave. Thus, the chargeable device sends the control current wave to the charger, wherein a current value of the control current wave is I.

When the chargeable device sends a control current wave, which has a current value of I, a voltage drop U of the resistor is collected by the ADC circuit, wherein U=I×R1. As a value of the R1 is known, the current value I of the control current wave can be obtained when the voltage drop U is collected by the ADC circuit. Furthermore, through comparing the current value I of the control current wave with a value of the referring current, a type of the control current wave can be obtained, wherein the type of the control current wave may be one of a positive current pulse, a negative current pulse, and a control current has a value equal to that of the referring current. Accordingly, a corresponding voltage is obtained and sent to the feedback unit 502.

For example, supposing the voltage drop U of the resistor collected by the ADC circuit is 1.8V, that is, U=1.8V, and R1=1KΩ. In this case, the current value I of the control current wave is 1.8 mA, that is, I=1.8 mA. If the referring current is 1.2 mA, the control current wave is a positive current pulse. Referring to Table 1, if the present voltage output from the charger is 5V, the voltage output from the charger is adjusted to 7V.

For another example, supposing the voltage drop U of the resistor collected by the ADC circuit is 2.4V, that is, U=2.4V, and R1=1KΩ. In this case, the current value I of the control current wave is 2.4 mA, that is, I=2.4 mA. If the referring current is 1.2 mA, the control current wave is the positive current pulse, and a difference between the current value of the control current wave and that of the referring current is 1.2 mA. Referring to Table 2, if the present voltage output from the charger is 5V, the voltage output from the charger is adjusted to 12V.

For another example, supposing the voltage drop U of the resistor collected by the ADC circuit is 0.6V, that is, U=0.6V, and R1=1KΩ. In this case, the current value I of the control current wave is 0.6 mA, that is, I=0.6 mA. If the referring current is 1.2 mA, the control current wave is a negative current pulse. Referring to Table 2, if the present voltage output from the charger is 5V, the voltage output from the charger is adjusted to 4.5V.

Figure 11:
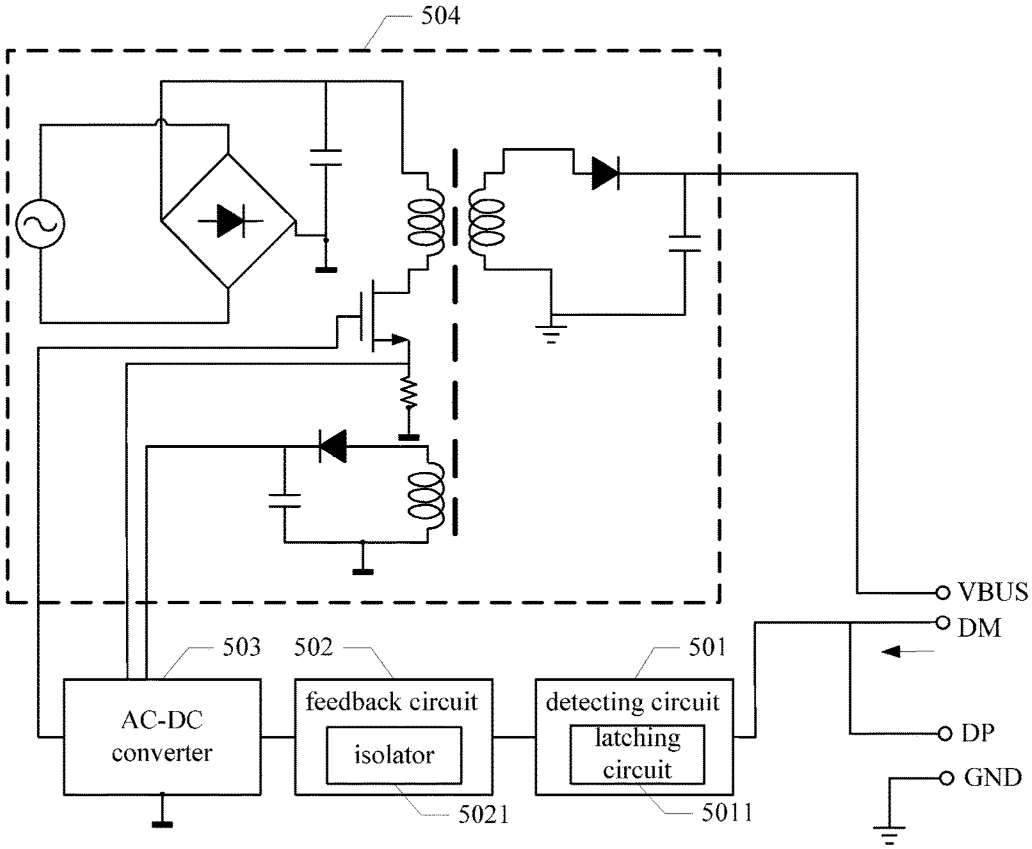
FIG. 11 schematically illustrates a structure of a chargeable device according to one embodiment of the present disclosure.

Referring to FIG. 11, a structure of a charger according to one embodiment of the present disclosure is illustrated. The charger includes: a detecting circuit 501, a feedback circuit 502, an AC-DC converter 503, and a switching power supply circuit 504.

The detecting circuit 501 includes a latching circuit 5011, wherein the latching circuit 5011 is configured to latch a present state of the charger, such as, a present output voltage of the charger. The feedback circuit 502 includes an isolating device 5021, wherein the isolating device 5021 is adapted to physically isolate the detecting circuit 501 and the AC-DC converter 503. The detecting circuit 501 is connected with a DM/DP pin of the charger, so as to receive a current wave from the chargeable device through the DM/DP pin.

Figure 12:
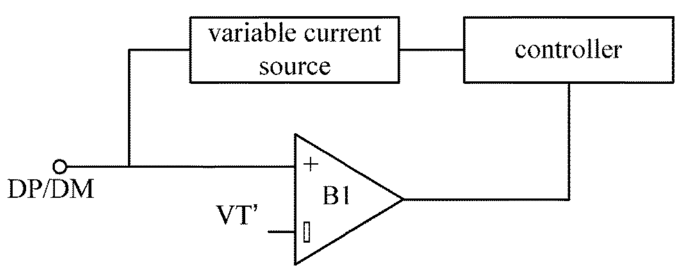
FIG. 12 schematically illustrates a structure of a chargeable device according to another embodiment of the present disclosure.

Referring to FIG. 12, a structure of a chargeable device according to one embodiment of the present disclosure is illustrated. The chargeable device includes: a variable current source, a controller, and a comparator B1. The comparator B1 has a first terminal input with a voltage on the DM/DP pin, and second terminal input with a threshold value VT' of the comparator B1. The chargeable device and the charger are connected through the DM/DP pin.

In some embodiments of the present disclosure, the variable current source is configured to output control current waves having different current values under control of the controller. The formation of the control current wave can refer to above related illustrations, which will not described in detail.

In some embodiments of the present disclosure, VT' may be have a value ranging from $I_0$×R1 to $I_0$×(R1+R2), that is, $I_0$×R1<VT'<$I_0$×(R1+R2). In some embodiments of the present disclosure, VT'=VT3. In some embodiments of the present disclosure, VT' may have any other values according to practical requirements, which will not be described in detail.

In some embodiments of the present disclosure, the comparator B1 may be replaced by an ADC circuit. The ADC circuit is configured to obtain a voltage drop on the detecting circuit of the charger, and send the voltage drop to the controller where a comparison between the voltage drop and $U_0$ is implemented. Specifically, when the voltage drop on the detecting circuit is less than $U_0$, the charger is determined as capable of receiving a control current wave from the chargeable device, thus the chargeable device can send the control current wave to the charger.

Moreover, referring to FIG. 6 and FIG. 7, and FIGS. 11 and 12, a detecting process of detecting whether the charger is capable of receiving a control current wave is as following.

The chargeable device is adapted to control the variable current source through the controller to send control current waves having different current values. During a charging process, a detecting current $I_0$ can be generated by the variable current source under control of the controller, and be sent to the charger via the DM/DP pin. The detecting circuit 501 of the charger receives the detecting current $I_0$ sent from the variable current source via the DM/DP pin.

Referring to FIG. 6 and FIG. 7, a voltage drop of the resistor in the detecting circuit 501 is $U_0$, wherein $U_0$=$I_0$×(R1+R2), and $U_0$>VT3. In other words, a voltage on the DM/DP pin is $U_0$. Moreover, in the chargeable device, a first terminal of the comparator B1 is input with the voltage on the DM/DP pin, and a second terminal of the comparator B1 is input with VT3, thus the comparator B1 generates a high level signal and sends it to a logic controller.

The logic controller of the charger is configured to: start recording time when all the comparators are detected outputting the high level signal; and send the high level signal to the gate of the NMOS transistor N1 when the recorded time reaches a preset time length T. Thus, the NMOS transistor N1 is switched on.

As shown in FIG. 6, the second resistor R2 is coupled with the source and the drain of the NMOS transistor N1, thus the second resistor R2 is shorted when the NMOS transistor N1 is switched on. In this case, the voltage drop in the charger is U', wherein U'=$I_0$×R1, and VT2<U'<VT3.

As the charger and the chargeable device are connected, when the voltage drop of the resistor in the detecting circuit is reduced to U', the voltage on the DM/DP pin of the charger is reduced to U' as well. Correspondingly, the voltage on the DM/DP pin of the chargeable device is reduced to U'. Moreover, the first terminal of the comparator B1 is input with the voltage on the DM/DP pin, and the second terminal of the comparator B1 is input with VT3 which is the threshold value of the comparator A3. Accordingly, when the voltage on the DM/DP pin changes, the comparator generates a low level signal and sends the low signal to the controller. When the low level signal is received by the controller, the charger is determined as capable of receiving the control current wave.

Keep referring to FIG. 6 and FIG. 7, and FIGS. 11 and 12, during a charging process, operations implemented by the charger and by the chargeable device are respectively as following.

Figure 13:
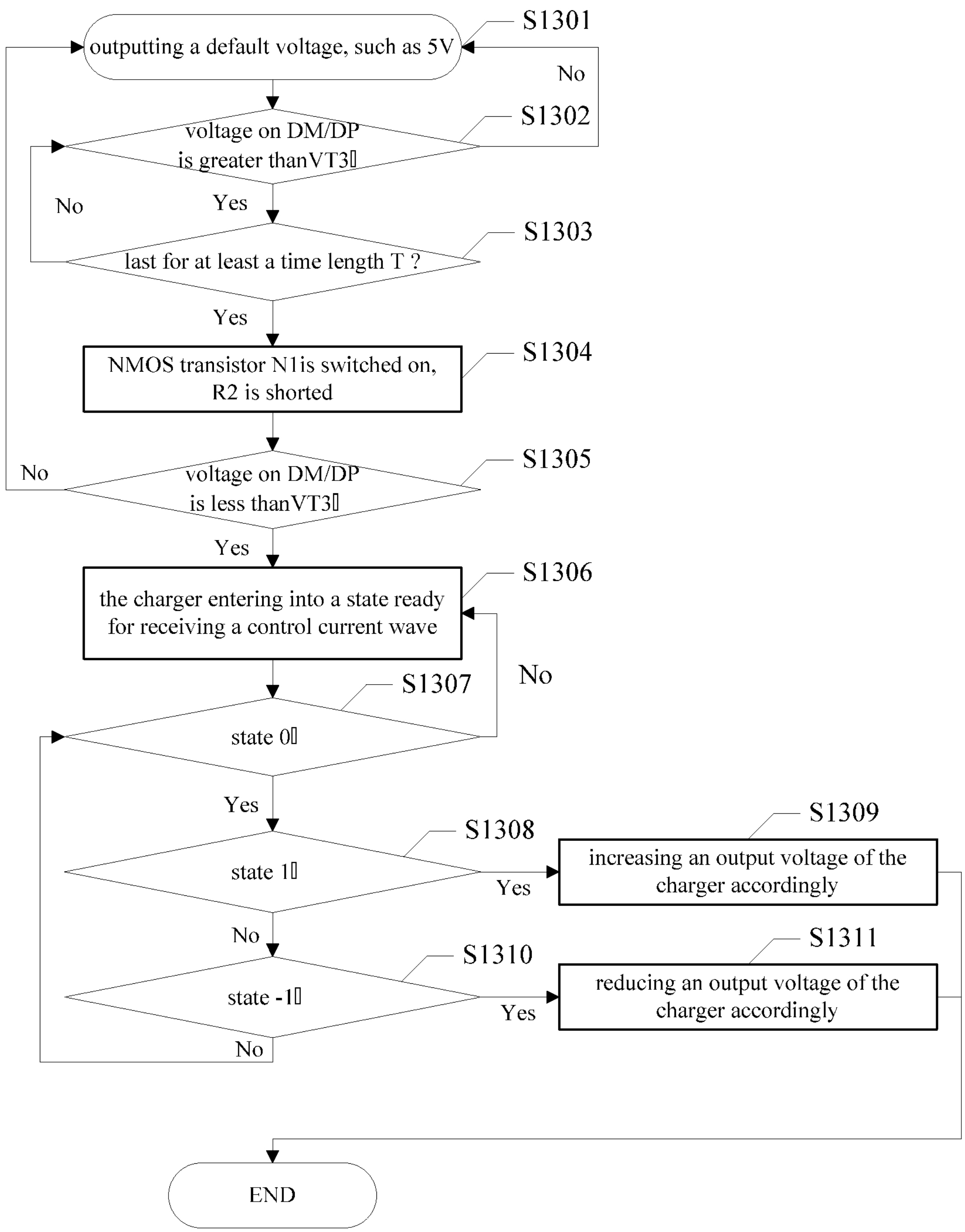
FIG. 13 schematically illustrates a working flow chart of a charger according to one embodiment of the present disclosure.

Referring to FIG. 13, an operation flow chart of the charger during a charging process according to one embodiment of the present disclosure is illustrated. The operations of the charger includes following steps from step S1301 to step S1311.

In step S1301, outputting a default voltage, such as 5V.

In some embodiments of the present disclosure, the default voltage is 5V. In some embodiments of the present disclosure, the default voltage may be any other value, which will not be described in detail.

In step S1302, determining whether a voltage on the DM/DP pin is greater than VT3.

In some embodiments of the present disclosure, when the voltage of the DM/DP pin is greater than VT3, step S1303 is implemented; and when the voltage of the DM/DP pin is less than VT3, step S1301 is implemented.

In step S1303, determining a time length during which the voltage on the DM/DP pin is greater than VT3.

In some embodiments of the present disclosure, when the time length, during which the voltage on the DM/DP pin is greater than VT3, is more than a preset time length T, step S1304 is implemented; and when the time length, during which the voltage on the DM/DP pin is greater than VT3, is less than a preset time length T, step S1302 is implemented.

In step S1304, switching on the NMOS transistor N1, so as to short the resistor R2.

After the NMOS transistor N1 is switched on, the resistor R2 is shorted, then step S1305 is implemented.

In step S1305, determining whether the voltage on the DM/DP pin is less than VT3.

When the voltage on the DM/DP pin is determined as less than VT3, step S1306 is implemented; and when the voltage on the DM/DP pin is determined as not less than VT3, step S1301 is implemented.

In step S1306, entering into a state ready for receiving a control current wave from the chargeable device.

In some embodiments of the present disclosure, when a value of the DM/DP is greater than that of the VT2 and less than that of the VT3, it is indicated as a state 0. In other words, the state 0 indicates that a current value of the control current wave output from the chargeable device is equal to that of the referring current. When the value of the DM/DP is greater than that of the VT3, it is indicated as a state 1. In other words, the state 1 indicates that the control current wave output from the chargeable device is a positive current pulse. When the value of the DM/DP is less than that of the VT2 and greater than that of the VT1, it is indicated as a state −1. In other words, the state −1 indicates that the control current wave output from the chargeable device is a negative current pulse.

In step S1307, determining whether a present state is the state 0.

In some embodiments of the present disclosure, when the present state is the state 0, step S1308 is implemented; and when the present state is not the state 0, step S1306 is implemented.

In step S1308, determining whether a present state is the state 1. When the present state is the state 1, step S1309 is implemented; and when the present state is not the state 1, step S1310 is implemented.

In step S1309, rising a voltage of the charger.

In step S1310, determining whether a present state is the state −1. When the present state is the state −1, step S1311 is implemented; and when the present state is not the state −1, step S1307 is implemented.

In step S1311, reducing the voltage of the charger.

In some embodiments of the present disclosure, step S1309 and step S1311 can be implemented by way recited above, such as the step S102.

Accordingly, through the steps from S1301 to S1311, the voltage output from the charger can be adjusted according to the control current wave from the chargeable device.

Figure 14:
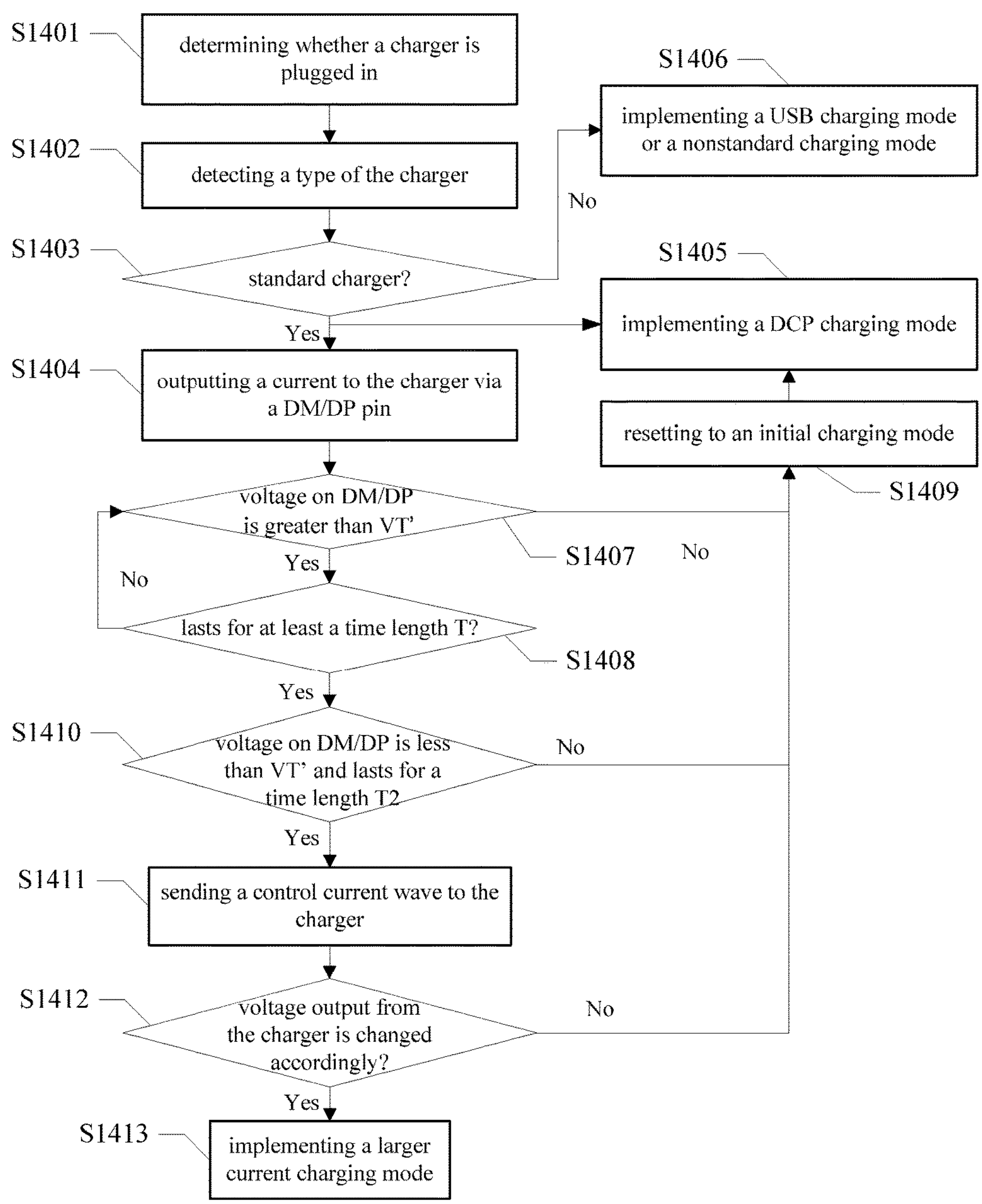
FIG. 14 schematically illustrates a working flow chart of a chargeable device according to one embodiment of the present disclosure.

Referring to FIG. 14, an operation flow chart of the chargeable device during a charging process according to one embodiment of the present disclosure is illustrated. The operations of the chargeable device includes following steps from step S1401 to step S1413.

In step S1401, determining whether a charger is plugged in.

In step S1402, detecting a type of the charger.

In some embodiments of the present disclosure, the type of the charger is detected by way of BC1.2. BC1.2 refers to a detecting method of Battery Charger Specification Revision version 1.2.

In step S1403, determining whether the charger is an international standard charger.

It can be understood that, in some embodiments of the present disclosure, any other ways may be employed to determine if the charger is the international standard charger, which will not be described in detail.

In some embodiments of the present disclosure, the international standard charger refers to a charger having a standard number of YD/T1591-2006. In some embodiments of the present disclosure, the international standard charger may refer to a charger having any other standard numbers, which will not be described in detail.

In some embodiments of the present disclosure, when the charger is the international standard charger, step S1404 or step S1405 is implemented; and when the charger is not the international standard charger, step S1406 is implemented.

In step S1404, outputting a current to the charger via a DM/DP pin.

In some embodiments of the present disclosure, after the current is inputting into the charger via the DM/DP pin, step S1407 is implemented.

In step S1405, implementing a DCP (Dedicated Charging Port) charging mode, wherein the DCP charging mode matches with the international standard charger.

In step S1406, implementing a USB charging mode or a nonstandard charging mode, wherein the USB charging mode and the nonstandard charging mode match with the charger which is not the international standard charger.

In step S1407, determining whether a value of a voltage on the DM/DP pin is greater than that of the VT'.

In some embodiments of the present disclosure, when the value of the voltage on the DM/DP pin is greater than that of the VT', step S1408 is implemented; and when the value of the voltage on the DM/DP pin is less than that of the VT', step S1409 is implemented.

In step S1408, determining whether a time length, during which the value of the voltage on the DM/DP pin is greater than that of the VT', reaches a preset time length T.

In some embodiments of the present disclosure, when the time length, during which the value of the voltage on the DM/DP pin is greater than that of the VT', reaches the preset time length T, step S1410 is implemented; and when the time length, during which the value of the voltage on the DM/DP pin is greater than that of the VT', does not reach the preset time length T, step S1407 is implemented.

In step S1409, resetting to an initial charging mode.

In step S1410, determining whether the value of the voltage on the DM/DP pin is less than the VT' and lasts at least for a time length T2.

In some embodiments of the present disclosure, when the value of the voltage on the DM/DP pin is less than that of the VT' during the time length T2, step S1411 is implemented; and when the value of the voltage on the DM/DP pin is not less than that of the VT' during the time length T2, step S1409 is implemented.

In step S1411, sending a control current wave to the charger.

In some embodiments of the present disclosure, the control current wave sent from the chargeable device to the charger may be: a positive current pulse, a negative current pulse, or a current having a current value equal to that of the referring current. In practice, the value of the control current wave may be selected according to practical requirements.

For example, if the voltage output from the charger is elevated by the chargeable device, then a positive current pulse is sent by the chargeable device. Fox another example, if the voltage output form the charger is reduced by the chargeable device, then a negative current pulse is sent by the chargeable device. The specific process of adjusting the voltage output from the charger by the chargeable device may refer to related descriptions recited above, which will not be described in detail herein.

In step S1412, detecting whether the voltage output from the charger is changed accordingly.

In some embodiments of the present disclosure, if the voltage output from the charger is not changed accordingly, the step S1409 is implemented; and if the voltage output from the charger is changed accordingly, the step S1413 is implemented.

In step S1413, implementing a fast charging mode.

Figure 15:
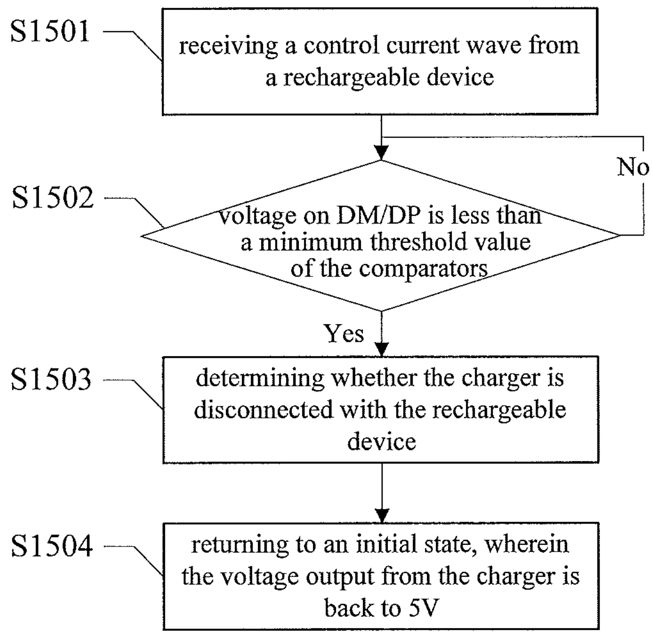
FIG. 15 schematically illustrates a working flow chart of a charger according to another embodiment of the present disclosure.

Referring to FIG. 15, a working flow chart of a charger according to one embodiment of the present disclosure is illustrated, which includes following steps from S1501 to S1504.

In step S1501, receiving a control current wave from a chargeable device.

In step S1502, determining whether a value of a voltage on a DM/DP pin is less than a minimum threshold value of the comparators.

In some embodiments of the present disclosure, when the value of the voltage on the DM/DP pin is less than the minimum threshold value of the comparators, step S1503 is implemented; and when the value of the voltage on the DM/DP pin is not less than the minimum threshold value of the comparators, keep implementing the step S1502.

In some embodiment of the present disclosure, the number of the comparators is n+1, and the minimum threshold value of the comparators is VT0. Accordingly, when the value of the voltage on the DM/DP pin is less than VT0, step S1503 is implemented; and when the value of the voltage on the DM/DP pin is not less than VT0, keep implementing the step S1502.

In step S1503, determining whether the charger is disconnected with the chargeable device.

In step S1504, returning to an initial state, wherein the voltage output from the charger is back to 5V.

Figures 16A, 16B, 16C:
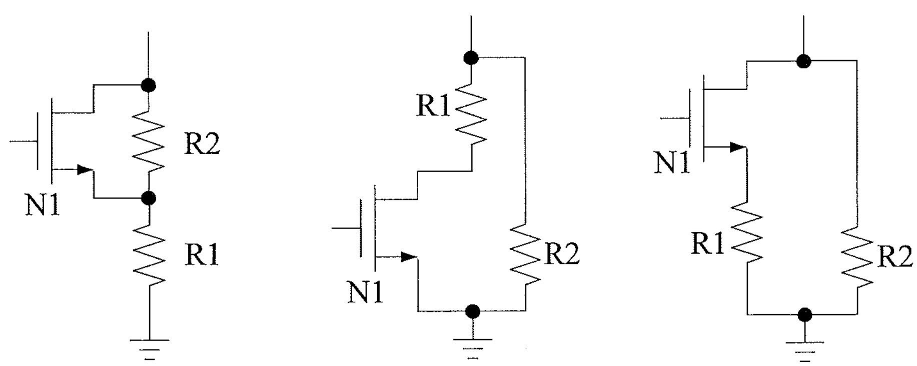
FIG. 16A, FIG. 16B, and FIG. 16C schematically illustrate a connecting relation between a NMOS transistor and a resistor according to one embodiment of the present disclosure.

In some embodiments of the present disclosure, connecting relations between the NMOS transistor N1 of the switching unit and the resistor R1, R2 are not limited to that described above. Referring to FIG. 16A, FIG. 16B, and FIG. 16C, connecting relations between the NMOS transistor N1 of the switching unit and the resistor R1, R2 according to some other embodiments of the present disclosure is illustrated.

As shown in FIG. 16A, a first end of the resistor R1 is coupled with the source of the NMOS transistor N1, and a second end of the resistor R1 is grounded. A first end of the resistor R2 is coupled with the drain of the NMOS transistor N1, and a second end of the resistor R2 is coupled with the source of the NMOS transistor N1. The gate of the NMOS transistor N1 is coupled with the logic controller, and the drain of the NMOS transistor N1 is coupled with first ends of the three comparators A1, A2 and A3. Accordingly, when the gate of the NMOS transistor N1 receives a control instruction from the logic controller, the NMOS transistor N1 is switched on, and R2 is shorted.

As shown in FIG. 16B, a first end of the resistor R1 is coupled with first ends of the three comparators A1, A2 and A3, and a second end of the resistor R1 is coupled with the drain of the NMOS transistor N1. A first end of the resistor R2 is coupled with a first end of the resistor R1, and a second end of the resistor R2 is grounded. The gate of the NMOS transistor N1 is coupled with the logic controller, and the source of the NMOS transistor N1 is grounded. Accordingly, when the NMOS transistor N1 is switched off, a resistance of the resistor is R, wherein R=R2; and when the NMOS transistor N1 is switched on, the resistor R1 and the resistor R2 are connected in a parallel mode, the resistance of the resistor R=(R1×R2)/(R1+R2).

As shown in FIG. 16C, a first end of the resistor R1 is coupled with the source of the NMOS transistor N1, and a second end of the resistor R1 is grounded. A first end of the resistor R2 is coupled with the drain of the NMOS transistor N1, and a second end of the resistor R2 is grounded. The gate of the NMOS transistor N1 is coupled with the logic controller, and the drain of the NMOS transistor N1 is coupled with first ends of the comparators A1, A2 and A3. Accordingly, when the NMOS transistor N1 is switched off, a resistance of the resistor is R, wherein R=R2; and when the NMOS transistor N1 is switched on, the resistor R1 and the resistor R2 are connected in a parallel mode, the resistance of the resistor R=(R1×R2)/(R1+R2).

According to one embodiment of the present disclosure, a charging system is also provided. The charging system includes a charger and a chargeable device.

The chargeable device is configured to send a control current wave to the charger. The control current wave is a positive current pulse, a negative current pulse, or a current having a current value equal to a reference current value. The positive current pulse refers to a pulse which has a current value greater than the reference current value and lasts at least for a first preset time length T1. The negative current pulse refers to a pulse which has a current value less than the reference current value and lasts at least for a second preset time length T2. The value of the referring current is greater than zero.

The charger is configured to receive the control current wave from the chargeable device. If the control current wave is the positive current pulse, an output voltage of the charger is adjusted to be greater than the present output voltage thereof. If the control current wave is the negative current pulse, the output voltage of the charger is adjusted to be less than the present output voltage thereof. If the control current wave is the current which has a current value equal to that of the referring current, the output voltage of the charger is maintained unchanged.

It can be understood by person skilled in the art that, some or all the steps in the methods or processes recited above may be implemented by hardware under instructions of programs. The programs may be stored in a storage medium accessible for a computer. The storage medium may include: a ROM (Read Only Memory), a RAM (Random Access Memory), a disc, or a light disk.

Although the present disclosure has been disclosed above with reference to preferred embodiments thereof, it should be understood by those skilled in the art that various changes may be made without departing from the spirit or scope of the disclosure. Accordingly, the present disclosure is not limited to the embodiments disclosed.

What is claimed is:

1. A charging method, comprising:

acquiring a control current wave from a chargeable device, wherein the control current wave is a positive current pulse, a negative current pulse, or a current having a current value equal to a reference current value;

if the control current wave is the positive current pulse, adjusting an output voltage of a charger to be greater than a present output voltage of the charger;

if the control current wave is the negative current pulse, adjusting the output voltage of the charger to be less than the present output voltage of the charger; and if the control current wave is the current having the current value equal to the reference current value, maintaining the output voltage of the charger unchanged;

wherein the positive current pulse refers to a pulse which has a current value greater than the reference current value and lasts at least for a first preset time length;

wherein the negative current pulse refers to a pulse which has a current value less than the reference current value and lasts at least for a second preset time length; and wherein the reference current value is greater than zero and the present output voltage of the charger is greater than zero.

2. The charging method according to claim 1, further comprising: receiving a detecting current sent from the chargeable device; and sending a feedback signal to the chargeable device when a time period of receiving the detecting current reaches a preset value, where the control current wave is acquired after the feedback signal is sent to the chargeable device.

3. The charging method according to claim 1, further comprising: after the output voltage of the charger is adjusted, resetting the output voltage of the charger to a default output voltage when a current value of the control current wave becomes zero.

4. The charging method according to claim 1, wherein adjusting the output voltage of the charger to be greater than the present output voltage of the charger comprises: selecting, in a preset voltage adjustment table, a minimum voltage value greater than a value of the present output voltage, wherein the selected minimum voltage value serves as the value of the adjusted output voltage of the charger; and adjusting the output voltage of the charger to be less than the present output voltage of the charger comprises: selecting, in the preset voltage adjustment table, a maximum voltage value less than the value of the present output voltage, wherein the selected maximum voltage value serves as the value of the adjusted output voltage of the charger.

5. The charging method according to claim 1, wherein adjusting the output voltage of the charger to be greater than the present output voltage of the charger comprises: implementing a subtraction to the current value of the positive current wave and the reference current value, so as to obtain a first current value deviation; obtaining a first adjusted output voltage value based on the first current value deviation and a first mapping table, wherein the first mapping table represents mapping between current value deviations and adjusted output voltage values, wherein in the first mapping table, the current value deviations correspond to the present output voltage, and the adjusted output voltage values are greater than the present output voltage; and adjusting the output voltage value of the charger to be the first adjusted output voltage value; and adjusting the output voltage of the charger to be less than the present output voltage of the charger comprises: implementing a subtraction to the current value of the negative current wave and the reference current value, so as to obtain a second current value deviation; obtaining a second adjusted output voltage value based on the second current value deviation and a second mapping table, wherein the second mapping table represents mapping between current value deviations and adjusted output voltage values, wherein in the second mapping table, the current value deviations correspond to the present output voltage, and the adjusted output voltage values are less than the present output voltage; and adjusting the output voltage value of the charger to be the second adjusted output voltage value.

6. A charging apparatus, comprising:

an acquiring unit configured to acquire a control current wave from a chargeable device, wherein the control current wave is a positive current pulse, a negative current pulse, or a current having a current value equal to a reference current value; and an adjusting unit configured to: if the control current wave is the positive current pulse, adjust an output voltage of a charger to be greater than a present output voltage of the charger, if the control current wave is the negative current pulse, adjust the output voltage of the charger to be less than the present output voltage of the charger, and if the control current wave is the current having the current value equal to the reference current value maintain the output voltage of the charger unchanged;

wherein the positive current pulse refers to a pulse which has a current value greater than the reference current value and lasts at least for a first preset time length;

wherein the negative current pulse refers to a pulse which has a current value less than the reference current value and lasts at least for a second preset time length; and wherein the reference current value is greater than zero and the present output voltage of the charger is greater than zero.

7. The charging apparatus according to claim 6, further comprising a detecting unit, wherein the detecting unit is configured to: receive a detecting current from the chargeable device; and send a feedback signal to the chargeable device when a time period of receiving the detecting current reaches a preset value.

8. The charging apparatus according to claim 6, further comprising a resetting unit, wherein the resetting unit is configured to: reset the output voltage of the charger to a default output voltage when a current value of the control current wave becomes zero.

9. A charging system, comprising a charger and a chargeable device;

wherein the chargeable device is configured to send a control current wave to the charger, the control current wave is a positive current pulse, a negative current pulse, or a current having a current value equal to a reference current value, wherein the positive current pulse refers to a pulse which has a current value greater than the reference current value and lasts at least for a first preset time length, the negative current pulse refers to a pulse which has a current value less than the reference current value and lasts at least for a second preset time length, and the reference current value is greater than zero; and wherein the charger is configured to: if the control current wave is the positive current pulse, adjust an output voltage of the charger to be greater than a present output voltage of the charger; if the control current wave is the negative current pulse, adjust the output voltage of the charger to be less than the present output voltage of the charger; and if the control current wave is the current having the current value equal to the reference current, maintain the output voltage of the charger unchanged, wherein the present output voltage of the charger is greater than zero.

* * * * *